United States Patent
Park et al.

(10) Patent No.: US 10,475,107 B2
(45) Date of Patent: Nov. 12, 2019

(54) DISPLAY APPARATUS AND CONTROL METHOD THEREOF

(71) Applicant: SAMSUNG ELECTRONICS CO., LTD., Suwon-si, Gyeonggi-do (KR)

(72) Inventors: Seong-ho Park, Bucheon-si (KR); Hee-min Kim, Seongnam-si (KR)

(73) Assignee: SAMSUNG ELECTRONICS CO., LTD., Suwon-si, Gyeonggi-do (KR)

( * ) Notice: Subject to any disclaimer, the term of this patent is extended or adjusted under 35 U.S.C. 154(b) by 337 days.

(21) Appl. No.: 15/459,197

(22) Filed: Mar. 15, 2017

(65) Prior Publication Data
US 2017/0278175 A1 Sep. 28, 2017

(30) Foreign Application Priority Data

Mar. 24, 2016 (KR) .................. 10-2016-0035087

(51) Int. Cl.
G06Q 30/06 (2012.01)
H04W 4/80 (2018.01)

(52) U.S. Cl.
CPC ..... G06Q 30/0633 (2013.01); G06Q 30/0603 (2013.01); G06Q 30/0641 (2013.01); G06Q 30/0643 (2013.01); H04W 4/80 (2018.02); G06Q 30/0601 (2013.01)

(58) Field of Classification Search
None
See application file for complete search history.

(56) References Cited

U.S. PATENT DOCUMENTS

| | | | |
|---|---|---|---|
| 7,200,567 B2 * | 4/2007 | Caci .................. | G06Q 30/06 235/383 |
| 7,376,591 B2 * | 5/2008 | Owens ............... | G06Q 30/02 705/14.4 |

(Continued)

FOREIGN PATENT DOCUMENTS

| KR | 10-2012-0119808 | 10/2012 |
|---|---|---|
| KR | 10-2013-0021179 | 3/2013 |

(Continued)

OTHER PUBLICATIONS

Anon., "High-Tech Features Key Total Guest Satisfaction," Hotel & Hotel Management 209.6: 23+, Questex Media Group, Inc., Apr. 4, 1994. (Year: 1994).*

*Primary Examiner* — Nicholas D Rosen
(74) *Attorney, Agent, or Firm* — Nixon & Vanderhye, P.C.

(57) ABSTRACT

Disclosed is a display apparatus including a display, a communicator comprising communication circuitry configured to communicate with an external apparatus, input circuitry configured to receive an input; and a controller configured to control a display to display an image based on a received broadcast signal, to generate a shopping list including information about selected goods based on an input selecting goods in the image displayed based on the broadcast signal, and to control the communicator to send the external apparatus detailed information about at least one of the goods included in the shopping list, the information including corresponding state information if the state information is received from the external apparatus. Thus a user may select goods in a TV program and be provided a shopping list including detailed information of selected goods.

16 Claims, 19 Drawing Sheets

(56) References Cited

U.S. PATENT DOCUMENTS

| | | | | |
|---|---|---|---|---|
| 8,156,009 B2* | 4/2012 | Karnalkar | ............ | G06Q 30/0207 705/26.1 |
| 8,191,091 B1* | 5/2012 | Harvey | .................. | G01R 1/071 725/38 |
| 8,843,830 B2* | 9/2014 | Eom | .................. | H04N 21/4858 345/1.2 |
| 8,885,109 B2* | 11/2014 | Yoon | ................ | H04N 21/42202 348/734 |
| 9,053,510 B2 | 6/2015 | Crum | .................... | G06Q 30/02 |
| 9,084,806 B2* | 7/2015 | Park | .................. | A61K 47/6939 |
| 2003/0004831 A1* | 1/2003 | Owens | .................. | G06Q 30/02 705/14.4 |
| 2003/0130909 A1* | 7/2003 | Caci | ...................... | G06Q 30/06 705/26.81 |
| 2004/0117276 A1* | 6/2004 | Kettler, III | ......... | G06Q 10/0875 705/29 |
| 2010/0299188 A1* | 11/2010 | Karnalkar | ........... | G06Q 30/0207 705/14.1 |
| 2012/0169940 A1* | 7/2012 | Eom | ................ | H04N 21/42224 348/734 |
| 2012/0260683 A1* | 10/2012 | Cheon | .................... | F25D 29/00 62/125 |
| 2013/0088648 A1* | 4/2013 | Yoon | ................ | H04N 21/42202 348/734 |
| 2013/0185150 A1* | 7/2013 | Crum | .................... | G06Q 30/02 705/14.49 |
| 2013/0191243 A1* | 7/2013 | Jung | .................. | G06Q 30/0633 705/26.8 |
| 2014/0071179 A1* | 3/2014 | Na | ........................... | G09G 5/10 345/690 |
| 2014/0158753 A1* | 6/2014 | Sisselman | ........... | G06F 16/9554 235/375 |
| 2014/0172648 A1* | 6/2014 | Gross | ................ | G06Q 30/0641 705/27.1 |

FOREIGN PATENT DOCUMENTS

| | | |
|---|---|---|
| KR | 10-2014-0026976 | 3/2014 |
| KR | 10-2014-0139945 | 12/2014 |

\* cited by examiner

DISPLAY APPARATUS AND CONTROL METHOD THEREOF

CROSS-REFERENCE TO RELATED APPLICATION

This application is based on and claims priority under 35 U.S.C. § 119 to Korean Patent Application No. 10-2016-0035087, filed on Mar. 24, 2016 in the Korean Intellectual Property Office, the disclosure of which is incorporated by reference herein in its entirety.

BACKGROUND

Field

The present disclosure relates generally to improvement in efficiency of a user's shopping by allowing the user to make a shopping list of goods desired to be purchased while the user is using a display apparatus and transmitting the generated shopping list to a portable terminal, and for example, to a display apparatus and a control method thereof, in which, if a user selects goods while viewing an image through a display apparatus, a shopping list including information corresponding to the selected goods is made and the shopping list is transmitted to a portable terminal based on a user's selection. Further, apparatuses and methods consistent with the example embodiments relate to a smart shopping system and a control method thereof, in which a portable terminal is attached to a cart of a mart (e.g., store) and transmits a shopping list to a terminal apparatus of the cart, and the terminal apparatus provides purchase information to a user based on the shopping list.

Description of Related Art

Internet of things (IOT) refers to an infrastructure for setting up a ubiquitous space, based on a new information communication basis for anytime and anywhere communication between a human and a thing and between a thing and a thing by connecting all things in the world through a network. Such a ubiquitous space begins with intellectualization of an environment or thing itself as computing devices having specific functions are embedded in the environment or thing.

The IOT may refer to a system where home devices exchange information with each other and perform operations based on the information, as technology of providing a more convenient and safe life to a user. For example, the system may allow a user to easily control an air conditioner, a refrigerator, etc. by controlling a TV while watching the TV. Further, the system may be configured to automatically perform corresponding functions based on environmental information such as a room temperature and the like or information obtained by sensing a user's operation.

As conventional IOT technology for improving shopping convenience, a terminal apparatus is attached to a cart 1101 or the like of a store to support a user's shopping service, user authentication is implemented, and a shopping list is received from a customer terminal, thereby simplifying payment.

However, the conventional IOT technology for the shopping is inconvenient for a user to purchase goods contained in an image displayed on the TV since the user has to separately search Internet for the goods. Further, the conventional IOT technology for the shopping needs complicated authentication procedures between the terminal of the store and the user. In addition, the conventional IOT technology for the shopping ha problems that a user has to experience complicated and difficult processes in order to use the corresponding service, and it is impossible to check a location of the cart 1101 and receive other auxiliary information or the like needed for the shopping list through the terminal of the store.

SUMMARY

The example embodiments may provide a display apparatus which allows a user to select goods in an image displayed thereon and sends a shopping list including the selected goods to an electronic apparatus.

According to an aspect of an example embodiment, a display apparatus is provided, including: a display; a communicator comprising communication circuitry configured to communicate with an external apparatus; a command input comprising input circuitry configured to receive an input; and a controller configured to control a display to display an image based on a received broadcast signal, to generate a shopping list including information about selected goods based on an input for selecting goods related to the image displayed based on the broadcast signal, and to control the communication circuitry of the communicator to send the external apparatus information about at least one of the goods included in the shopping list, the information corresponding to state information if the state information is received from the external apparatus.

The information about the selected goods may include information of at least one of: a name, a price, a place where to buy and a manufacturer of the selected goods.

If purchase information that the goods included in the transmitted shopping list are purchased is received from the external apparatus, the controller may control the display to display information about at least one of methods of using, refunding, keeping the purchased goods, and other goods related to the purchased goods.

The controller may update the shopping list with the information about the related goods in response to an input for selecting different goods related to the purchased goods, and transmits the updated shopping list to the external apparatus.

The state information may include information about a least one of: a location, a temperature, a smell and a sound of an external apparatus.

The detailed information may include an image displayed on the display when a user selects the goods.

The controller may add goods involved in a partial area on the image to the shopping list based on an input for selecting the partial area.

If the state information is received from a plurality of external apparatuses, the controller may transmit at least one piece of detailed information corresponding to each received state information among the goods included in the shopping list to each external apparatus from which the state information is received.

According to an aspect of another example embodiment, a method of controlling a display apparatus is provided. The method includes: displaying an image on a display based on a received broadcast signal; generating a shopping list including information about selected goods based on an input for selecting goods in the image displayed based on the broadcast signal; and sending an external apparatus detailed information about at least one of the goods included in the shopping list, the information corresponding to state information if the state information is received from the external apparatus.

The information about the selected goods may include information about at least one of: a name, a price, a place where to buy and a manufacturer of the selected goods.

The method of controlling the display apparatus may further include, displaying information about at least one of methods of using, refunding, keeping the purchased goods, and other goods related to the purchased goods if purchase information of informing that the goods included in the transmitted shopping list are purchased is received from the external apparatus.

The method of controlling the display apparatus may further include, updating the shopping list with the information about the related goods in response to an input for selecting different goods related to the purchased goods; and transmitting the updated shopping list to the external apparatus.

The state information may include information about a least one of: a location, a temperature, a smell and a sound of the external apparatus.

The detailed information may include an image displayed on the display when a user selects the goods.

The generating the shopping list may include adding goods involved in a partial area on the image to the shopping list based on an input for selecting the partial area.

The method of controlling the display apparatus may further include, if the state information is received from a plurality of external apparatuses, transmitting detailed information corresponding to at least one received state information among the goods included in the shopping list to each external apparatus from which the state information is received.

According to an aspect of another example embodiment, a portable terminal is provided, including: a display; a communicator comprising communication circuitry configured to communicate with a sensor and an external apparatus; and a controller configured to control the display to display a shopping list received from the external apparatus, to transmit state information received from a sensor to the external apparatus, and to control the display to display guide information generated based on detailed information about goods corresponding to the state information if the detailed information is received from the external apparatus.

The state information may relate to a least one of: a location of the portable terminal and a temperature, a smell and a sound around the portable terminal.

A shopping list including goods information may be generated if the goods information is received from a communication module of the goods.

The portable terminal may further include a payment processor and the controller may control the payment processor to pay for goods based on information about payment received from a user and the shopping list.

BRIEF DESCRIPTION OF THE DRAWINGS

The above and/or other aspects, features and attendant advantages of the present disclosure will become apparent and more readily appreciated from the following detailed description, taken in conjunction with the accompanying drawings, in which like reference numerals refer to like elements, and wherein.

DETAILED DESCRIPTION

Below, various example embodiments will be described in detail with reference to accompanying drawings. However, detailed descriptions about publicly known functions or elements, which may cloud the gist of the present disclosure, may be omitted in the following description and accompanying drawings. If possible, like numerals refer to like elements throughout the accompanying drawings.

Terms or words used in the present disclosure and the appended claims set forth herein shall be construed to have a meaning matching with the present disclosure on the principle that the inventor can define terms for the best way to describe his/her own disclosure. Therefore, the various example embodiments described in the present disclosure and features illustrated in the accompanying drawings are merely examples that do not limit the present disclosure, and it is thus appreciated that various equivalents and modifications can be made as alternatives at the time of the present disclosure.

Throughout the disclosure, if a certain element 'includes' an additional element, the certain element does not exclude the other elements but may further include an additional element unless otherwise noted. Further, a '~portion' used in this disclosure may refer, for example, to a field-programmable gate array (FPGA) or the like software, or an application-specific integrated circuit (ASIC) or the like hardware element, in which the '~portion' is configured to perform a specific function. However, the '~portion' is not restrictively construed as software or hardware. The '~portion' may be configured in a storage medium to be addressed, or may be configured to reproduce one or more processors.

Below, example embodiments will be described in detail with reference to accompanying drawings so as to be easily realized by a person having an ordinary skill in the art. The present disclosure may be embodied in many different forms, and not limited to the following embodiments. Portions unrelated to the descriptions may be omitted for clarity, and like numerals refer to like elements throughout.

Figure 1:
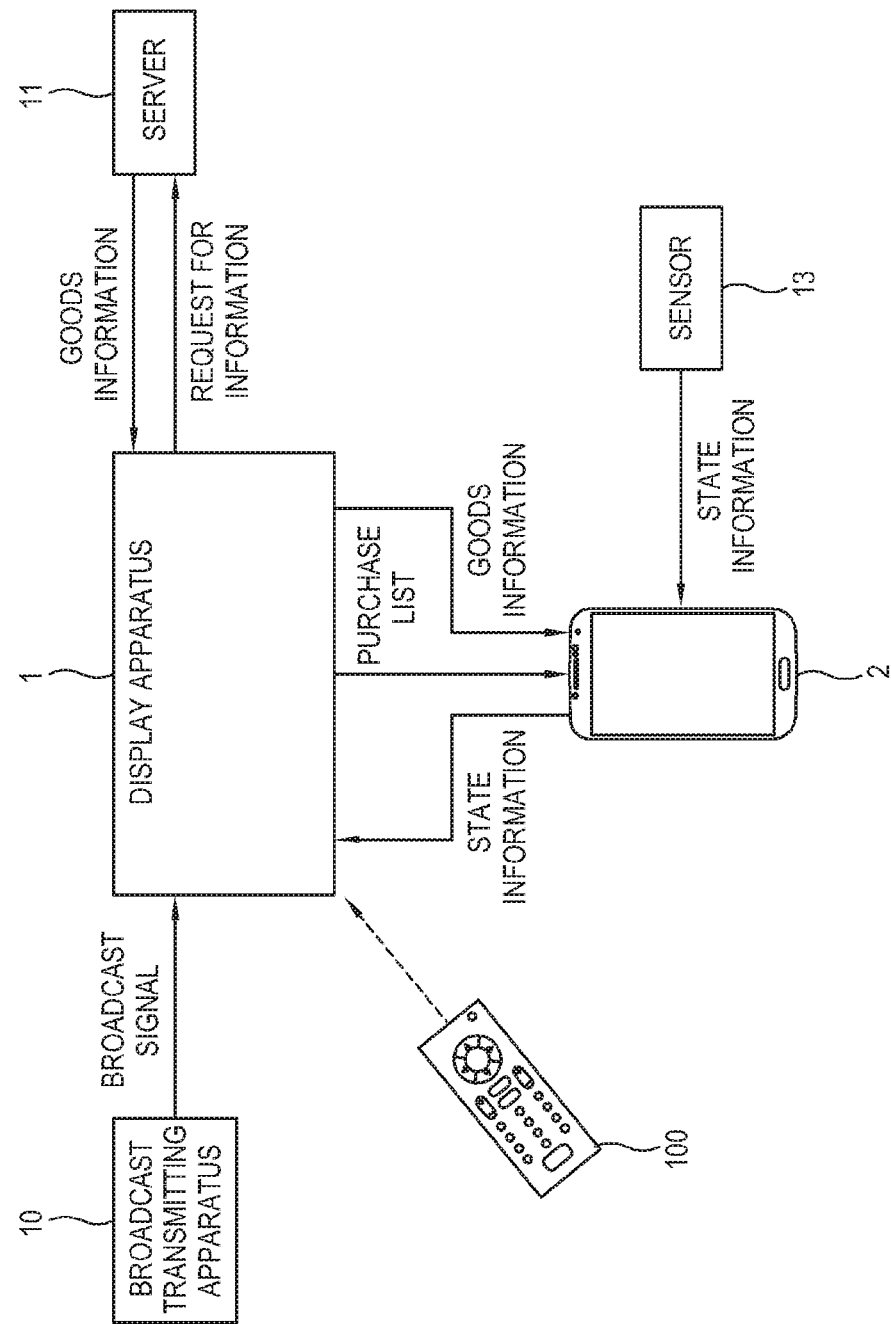
FIG. 1 is a diagram illustrating an example IOT system including a display apparatus and a portable terminal according to an example embodiment of the present disclosure.

FIG. 1 is a diagram illustrating an example IOT system including a display apparatus and a portable terminal according to an example embodiment of the present disclosure.

The display apparatus 1 may be configured to receive a broadcast signal from a broadcasting station or the like broadcast transmitting apparatus 10 for transmitting an image signal, and display an image based on the received broadcast signal.

A user may use a remote controller 100 or the like to control the display apparatus 1, and particularly to input a control command for selection or the like with regard to goods on a displayed image. The display apparatus 1 may be configured to receive information about the selected goods from a server 11 and provide the information to a user if the goods are selected while an image is displayed, or may be configured to make a shopping list including the selected goods. The server 11 may be configured to interwork with the broadcast transmitting apparatus 10 and transmit goods information carried in the broadcast signal provided by the broadcast transmitting apparatus 10 to the display apparatus 1, or provide the goods information corresponding to a request if receiving the request for the goods information from the display apparatus 1.

A user may control the display apparatus 1 to transmit the shopping list to a desired external apparatus or portable terminal 2. The shopping list may be directly transmitted to the portable terminal 2 or indirectly transmitted to the portable terminal 2 via the server connecting with the display apparatus 1 through a network.

A sensor 13 may be configured to use an infrared ray, a global positioning system (GPS) or the like sensor to determine a user's location and transmit location information to the portable terminal 2. Further, the sensor 13 may be configured to sense surrounding environments to generate information about an ambient temperature, a sound, a smell, or the like (hereinafter, referred to as 'state information'), and transmit the generated state information to the portable terminal 2.

The portable terminal 2 may be configured to receive the state information from the sensor 13, or generate the state information through a camera, a GPS sensor, a gyro sensor, a microphone, a thermal sensor and the like mounted to the portable terminal and then transmit the generated state information to the display apparatus 1.

The display apparatus 1 may be configured to detect goods close to the goods included in the shopping list based on the location information received from the portable terminal 2, and transmit detailed information about the detected goods to the portable terminal 2 if the close goods are detected. The goods information may include the image, name, price, discount information and the like detailed information about the goods.

As described above, the portable terminal 2 may be configured to receive not only the location information but also the state information about surrounding environments such as an external temperature, a smell and a sound from the sensor 13, and transmit the received state information to the display apparatus 1. The display apparatus 1 may be configured to transmit the detailed information about recommended goods to a user based on various pieces of information.

The portable terminal 2 is configured to provide the shopping list and the goods information to a user, so that the user can make a purchase based on the shopping list and the goods information displayed on the portable terminal 2.

According to an example embodiment, the IOT system is not limited to the foregoing description with reference to FIG. 1. The display apparatus 1 may be configured to communicate with a plurality of portable terminals 2, and transmit the generated shopping list to each of the plurality of portable terminals 2. The display apparatus 1 may be configured to receive the state information from each of the plurality of portable terminals 2, and send each portable terminal 2 the detailed information about the goods included in the shopping list corresponding to the received state information.

Figure 2:
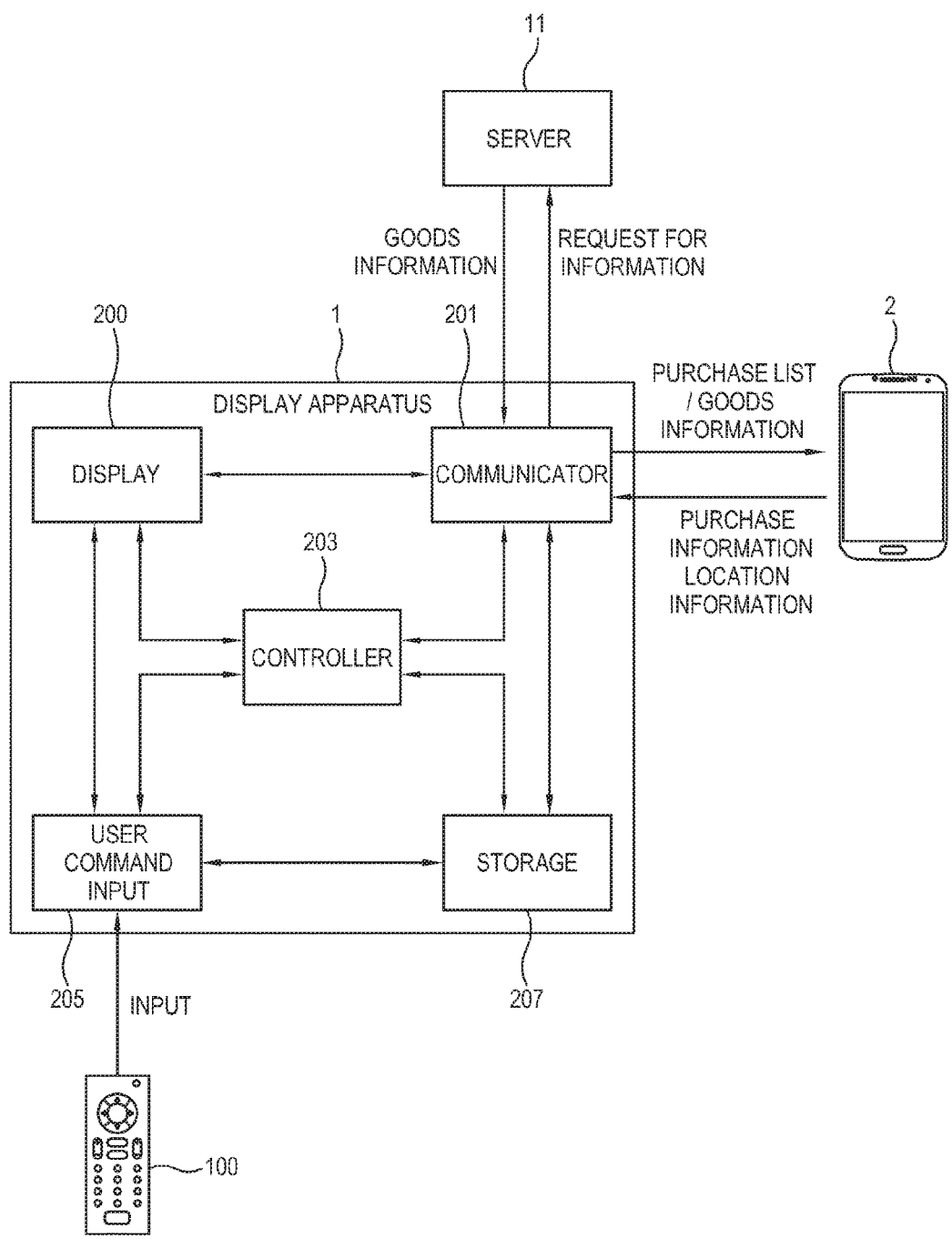
FIG. 2 is a block diagram illustrating an example display apparatus according to an example embodiment of the present disclosure.

FIG. 2 is a block diagram illustrating an example display apparatus according to an example embodiment of the present disclosure.

The display apparatus 1 may be configured to display an image corresponding to the goods based on a broadcast signal received from the outside or the like signal including image information, generate a shopping list related to the information about the goods selected by a user's input, and transmit the generated shopping list to an external apparatus based on a user's selection. The display apparatus 1 may be achieved by various electronic apparatuses such as a smart phone, a tablet computer, a personal computer, a laptop computer, a television (TV), a set-top box, a smart watch, or the like, but is not limited thereto, and may include a display 200, a communicator (e.g., including communication circuitry) 201, a user command input 205, a storage 207 and a controller (e.g., including processing circuitry) 203.

The display 200 is configured to display an image based on an image signal received in the display apparatus 1. The display 200 includes a display panel on which an image is displayed, a backlight unit used as a light source for emitting light to the display panel, and a driver for driving the display panel and the light source by supplying power. If the display panel is a non-emissive element, light from the light source is needed to display an image. On the other hand, if the display panel is a self-emissive element, a driving circuit may directly supply power to the self-emissive element of the display panel so that the display panel can emit light, thereby displaying an image. The display 200 may include a touch screen for directly receiving a user's command input. The display apparatus 1 may be configured to display at least one image corresponding to goods through the display 200 so that a user can select the goods by directly clicking the goods displayed on the image or through a user interface (UI) including a list of goods.

The communicator 201 may include various communication circuitry and is configured to communicate with external apparatuses 2, 10 (illustrated, for example, in FIG. 1) and 11. In more detail, the communicator 201 is configured to enable the display apparatus 1 to receive or provide information from or to various external apparatuses such as the broadcast transmitting apparatus 10, the server 11, the portable terminal 2, etc. The communicator 201 may perform a plurality of wired communications through a wired local area network (LAN). Further, the communicator 201 may perform wireless communication. The communicator 201 may include a radio frequency (RF) circuit for transmitting/receiving an RF signal to perform one or more kinds of wireless communication among Wi-Fi, Bluetooth, Zigbee, ultra-wide band (UWB), wireless USB, and near field communication (NFC).

The communicator 201 may include a signal receiver for receiving a broadcast signal or the like image signal. Further, the signal receiver may include an antenna for receiving an image signal from the exterior, a tuner for processing a signal received through the antenna and providing image information, a demodulator, and so on. The communicator 201 may be configured to receive at least one among a terrestrial broadcast signal, a satellite signal and a cable signal. Further, the communicator 201 may receive a broadcast signal or the like through a digital broadcast system such as digital multimedia broadcasting-terrestrial (DMB-T), digital multimedia broadcasting-satellite (DMB-S), media forward link only (MediaFLO™), digital video broadcast-handheld (DVB-H), integrated services digital broadcast-terrestrial (ISDB-T), etc. The received broadcast signal is processed for displaying an image embedded therein and then provide to the display 200, and the display 200 is configured to display an image based on the processed image signal.

The user command input 205 may include various circuitry for receiving input signals and be configured to receive inputs from various control elements, including a mouse, a keyboard, a remote controller 100, etc. to receive a user's command input. The user command input 205 may be configured to directly receive a control command through a control panel, or receive a signal including a user's command input from the remote controller 100, the keyboard, the mouse or the like external apparatus. The user command input 205 may be achieved in the form of a touch pad. For example, the user command input 205 may be achieved by a touch screen for receiving a user's touch input on the display panel of the display 200 as described above.

According to an example embodiment, the display apparatus 1 may be configured to select goods desired to be purchased by a user in response to an input to the user command input 205 with regard to a displayed image, make a shopping list including information about the selected goods, and transmit the made shopping list to an external apparatus such as the portable terminal 2 or the like selected in response to a user's another input. The information about the selected goods may be transmitted from the server 11 or the like in connection with the broadcast signal together with a broadcast signal transmitted from the broadcast transmitting apparatus 10.

According to another example embodiment, the display apparatus 1 makes a request for information about goods selected based on a user's input to the server 11, and the server 11 gives the requested information about the goods to the display apparatus 1.

According to still another example embodiment, the display apparatus 1 may transmit an image or name of goods to a search server in order to retrieve information about the selected goods if the information about the goods selected by a user's input is not stored in the server 11 in connection with the broadcast signal. The search server does a search based on the image or name of the goods through a network, and transmits a search result to the display apparatus 1. The display apparatus 1 may be configured to display the search result on the display 200 or make a shopping list including information generated based on the search result.

Further, the display apparatus 1 may be configured to transmit detailed information about goods corresponding to location information among the goods included in the shopping list to the portable terminal 2 if the location information is received from the portable terminal 2. The detailed information of the goods includes various pieces of information such as the image, name, price, manufacturer, release date, discount information, etc. of the goods. Thus, a user can go shopping while receiving the shopping list and the detailed information about the goods from the portable terminal 2.

Further, if the purchase information of informing that the goods included in the shopping list are purchased is received from the portable terminal 2 after a user finishes the shopping, the user may make an additional input for purchasing additional goods based on the purchase information through the user command input 205 and thus the display apparatus 1 may transmit additional information based on the additional input to the portable terminal 2. Further, the display apparatus 1 according to another example embodiment updates the shopping list by adding selected goods and transmits the updated shopping list to the portable terminal 2 again if a user selects different goods for purchasing the different goods related to the goods purchased based on the purchase information.

The storage 207 may be configured to store various pieces of information or data, such as information related to goods, a shopping list, etc. transferred to, generated in or used in the display apparatus 1. The storage 207 may be achieved by a nonvolatile memory (e.g., a writable read only memory (ROM) so that data can be retained and changes can be reflected even through the display apparatus 1 is powered off. That is, the storage 207 may be achieved by one of a flash memory, erasable programmable read only memory (EPROM), and an electrically erasable programmable read only memory (EEPROM). The information about goods may include the name and price of the goods, a place where to buy the goods, the manufacturer, how to claim a refund, how to keep the goods, how to use the goods, information about different goods related to the goods, etc. The information about the goods may also include a first image generated based on an image of when a user selects the goods. The first image may include a still image stored by capturing an image of when a user selects the goods, or a moving image stored as much as a preset period of time with respect to the moment of selecting the goods. The stored first image may be provided to the user when the purchase information of informing that a user purchases the goods.

The controller 203 may include various processing circuitry and be configured to control general operations of the display apparatus 1. In more detail, the controller 203 controls the display 200 to display an image including at least one of the goods based on the received broadcast signal, makes a shopping list including information about the goods selected by a user's input corresponding to the image, and controls the communicator 201 to transmit the shopping list to the portable terminal 2 selected by a user's selection for selecting the external apparatus or another external apparatus. The controller 203 may include at least one processor for performing the foregoing functions.

The information about the goods may be received from the server 11 and provided. The server 11 may transmit the goods information related to the broadcast signal transmitted from the broadcast transmitting apparatus 10 to the display apparatus 1 for receiving the broadcast signal.

According to another example embodiment, the controller 203 allows a user to make a request for the information about the selected goods to the server 11, and controls the server 11 to transmit the information about the goods to the display apparatus 1 in response to the request.

According to still another example embodiment, the controller 203 controls the communicator 201 to send the image or name of the goods selected by a user to the search server if the server 11 does not have the information about the goods selected by a user. Here, the search server may be configured to do a search for the information on the network based on the received image or name of the goods, and send a search result to the display apparatus 1. The controller 203 may be configured to make a shopping list including information based on the search result received from the search server.

The information about the selected goods may include information needed for a user to purchase the goods, such as the name and price of the goods, a place at which to buy the goods, the manufacturer of the goods, etc., which is transmitted from the server 11 or searched by the search server and included in the shopping list.

Further, the controller 203 may be configured to determine proximity to the location of at least one of the goods included in the shopping list if the location information is received from the portable terminal 2, and transmit detailed information about the close goods to the portable terminal 2. The detailed information about the goods may include various pieces of information such as the image, name, manufacturer, price, discount information and the like of the goods.

According to another example embodiment, the portable terminal 2 may be configured to generate various pieces of information (e.g., referred to herein as "state information") such as an ambient temperature, a shape of goods, a smell, a sound, etc. as well as the location information about the location of the portable terminal 2 based on the information received from an external sensor 13 or a built-in sensor 13 and transmit the generated information to the display apparatus 1, and the controller 203 may be configured to transmit the detailed information of the goods related to the received information to the portable terminal 2.

That is, the display apparatus 1 may determine whether a user is close to at least one among the goods included in the shopping list, based on the state information received from the portable terminal 2. The display apparatus 1 may send the detailed information about the goods to a user if it is determined that a user is close to a place that sells the goods included in the shopping list, based on a user's location information and state information comprising at least one of temperature, sound and smell of surrounding received from the sensor 13.

For example, if the selected goods have to be kept at a specific temperature, the display apparatus 1 may determine that the user is close to the selected goods based on the state information of surrounding temperature received from the portable terminal 2.

Further, if the selected goods have a specific smell, the display apparatus 1 may determine that the user is close to the selected goods based on the state information of surrounding smell received form the portable terminal 2.

Further, the state information may comprise various states related to the goods, such as sounds of surrounding sellers, images of goods, surrounding geographical features, and etc.

The display apparatus 1 may determine whether a user is close to the selected goods based on the received state information. The display apparatus 1 may transmit the detailed information about the goods corresponding to the state information to the portable terminal 2 if it is determined that the user is close to the selected goods.

The display apparatus 1 may provide the information about the purchased goods to a user if the purchase information that the user purchases the goods included in the shopping list is received from the portable terminal 2. The information about the purchased goods may include information about using and keeping the goods, information about refunding the goods, and information for helping a user to utilize the purchased goods. Further, the controller 203 may generate and store the first image based on an image displayed when a user selects the goods, and provide a user with the first image through the display 200 when a user gives the purchase information. The first image may include a still image of an image displayed when a user selects the goods or a moving image stored as much as a preset period of time with respect to the moment of selecting the goods.

According to another example embodiment, the display apparatus 1 may be configured to transmit the stored first image to the portable terminal 2 as the detailed information of the goods based on the state information received from the portable terminal 2.

With reference to the information about the goods provided by the display apparatus 1, an additional input may be possible. For instance, a user may make an input to the display apparatus 1 with regard to goods related to the purchased goods, or goods desired to be additionally purchased regardless of the purchased good. The controller 203 may be configured to control the communicator 201 to transmit additional information to the portable terminal 2 or the like external apparatus in response to a user's additional input.

As described above, the display apparatus 1 and the portable terminal 2 may not be in the same place, and thus a user who makes an input for selecting goods and selecting the external apparatus to the display apparatus 1 may be different a user who uses the portable terminal 2. For example, a user at home may use the display apparatus 1 to make a shopping list and transmit it to a portable terminal 2 owned by a user who is at a market, and if the purchase information of informing that the user at the market purchases the goods is transmitted to the display apparatus 1 and thus related information is provided through the display apparatus 1, the user who is at home may make an additional input to transmit additional information to the portable terminal 2 of the user who is at the market so that the user at the market can additionally purchase the goods.

Below, an example of making a shopping list through the display apparatus 1 will be described with reference to the accompanying drawings.

Figure 3:
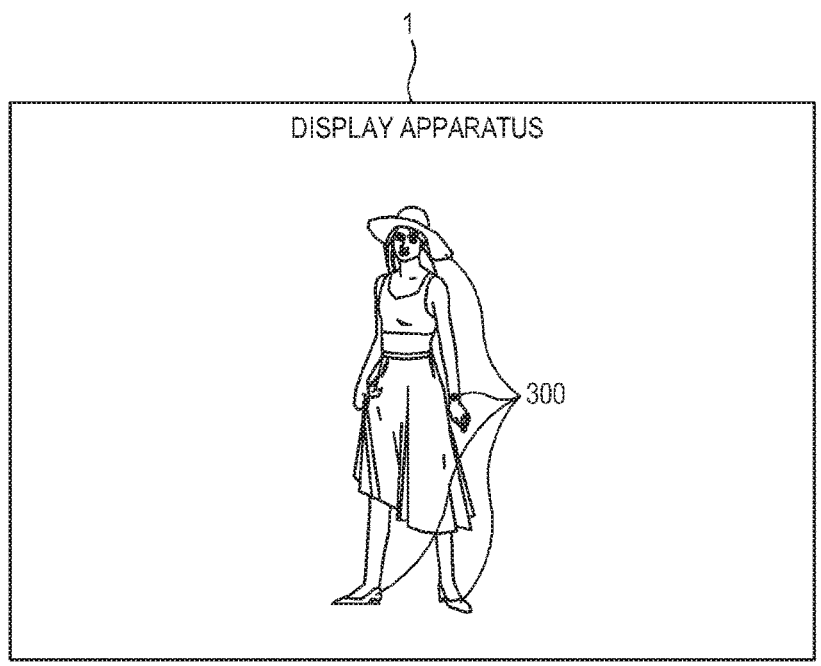
FIG. 3 is a diagram illustrating an example in which a user selects goods in an image according to an example embodiment of the present disclosure.
Figure 4:
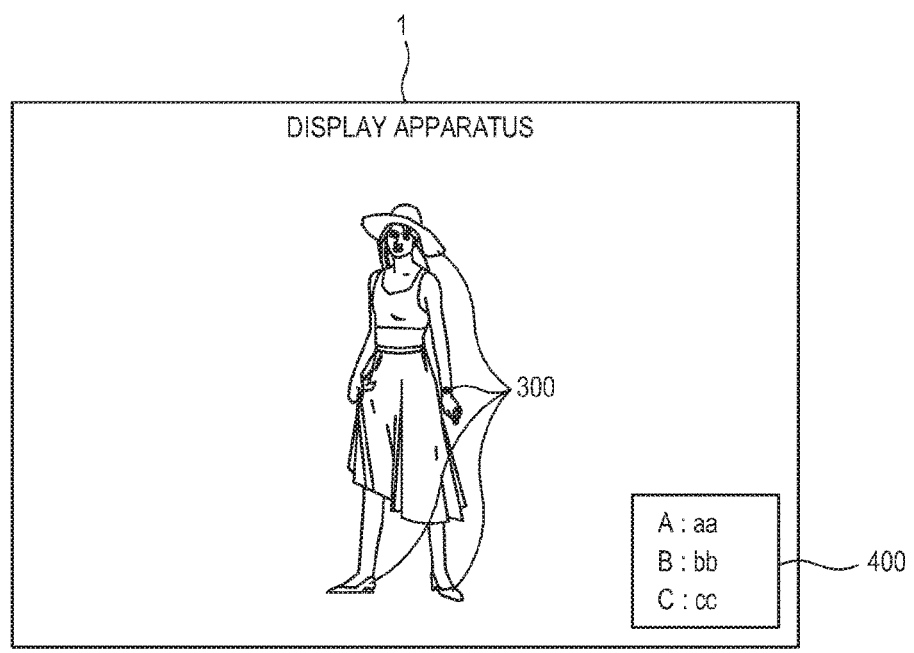
FIG. 4 is a diagram illustrating an example in which a user selects goods in an image according to an example embodiment of the present disclosure.

FIGS. 3 and 4 are diagrams illustrating examples in which a user selects goods in an image according to an example embodiment of the present disclosure.

FIG. 3 illustrates an example in which a user directly selects goods 300 displayed on an image to thereby make a shopping list.

The display apparatus 1 receives an image signal from various content providers such as a broadcasting station and the like, and displays an image based on the received signal. The displayed image may include various goods 300 which are actually on sale, and a user may select the goods 300 displayed on the image and add the selected goods to the shopping list. The goods 300 displayed on the image and selectable by a user may be displayed distinguishably from other portions not allowed to be selected. For example, the image may include a guide for informing the selectable goods 300 or a UI of including items for highlighting the selectable goods 300.

A user may select the goods 300 by directly touching the display 200 or using an input unit such as a control pad, the remote controller 100, etc. For example, a user selects at least one among the selectable goods 300 by pressing an arrow button of the remote controller 100 or the control pad of the display apparatus 1, and confirms the selection by pressing an OK button. According to another example embodiment, a user may select at least one among the displayed goods 300 by directly moving the remote controller 100. To this end, the display apparatus 1 may be configured to make the remote controller 100 detect an area where the image is directly pointed. To distinguish the areas directly pointed by the remote controller 100, the remote controller 100 may include a laser pointer and the display apparatus 1 may include a laser distinguishing module. Further, the remote controller 100 includes a location detecting sensor or the like and transmits the sensed information to the display apparatus 1, and the controller 203 of the display apparatus 1 may be configured to determine the area pointed by the remote controller 100 based on the sensed information.

FIG. 4 illustrates an example of making a shopping list 400 as a user selects an item corresponding to the goods displayed on the UI.

The display apparatus 1 may be configured to provide a UI comprising an item 400 indicating the goods 300 selectable by a user. The controller 203 may be configured to control the display 200 to display the UI including the item 400 for a user to select the goods 300 easily, when there are selectable goods 300 in the displayed image. The controller 203 determine whether there are selectable goods in the displayed image based on an image signal received through the communicator 201 and the goods information received from the server 11.

A user may select goods 300 by selecting a menu item 400 of the displayed UI. Like the direct selection of the goods 300, the selection of the menu item may be achieved by direct touch of the display 200 or selection using the input unit such as the control pad, the remote controller 100, etc. In this regard, the foregoing descriptions may be referred to again, and thus detailed descriptions will be omitted.

Figure 5:
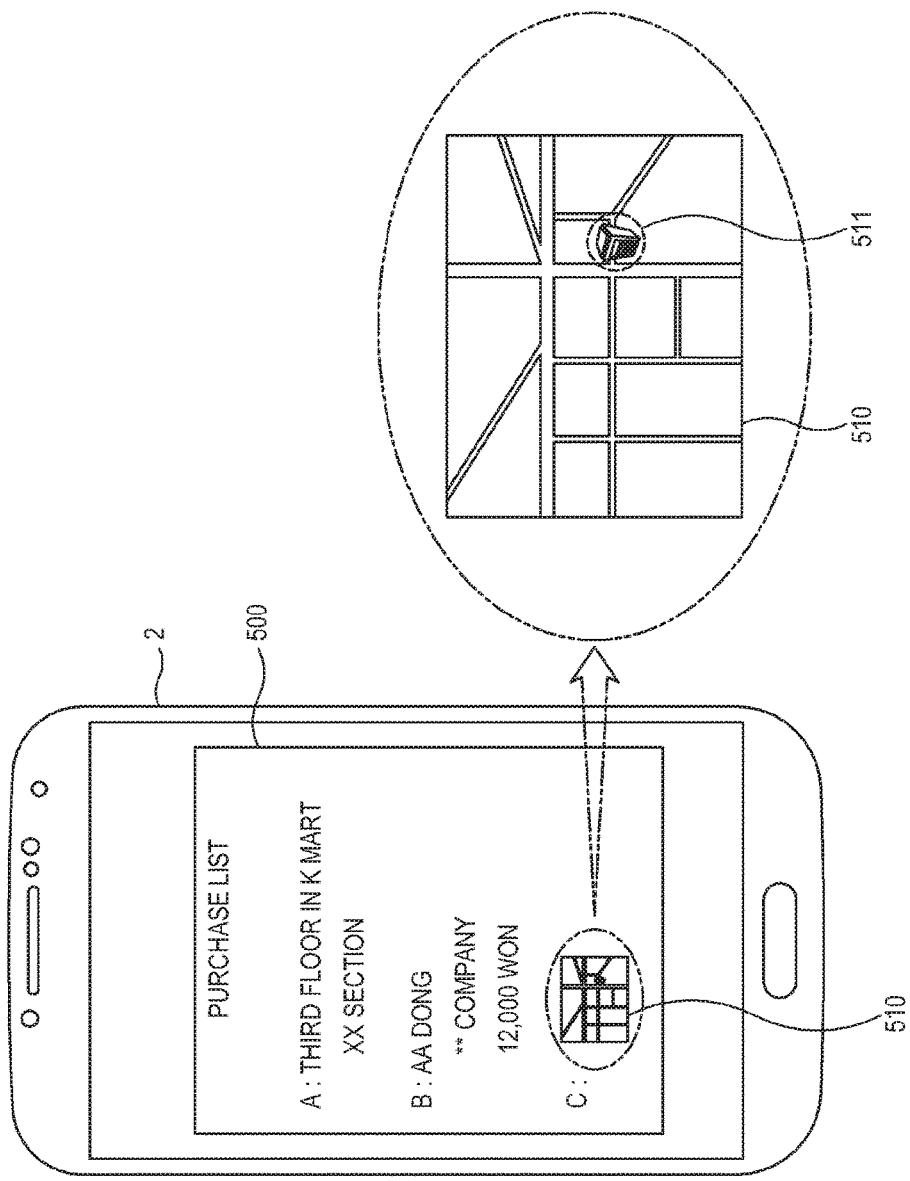
FIG. 5 is a diagram illustrating an example of a shopping list according to an example embodiment of the present disclosure.

FIG. 5 illustrates an example of a shopping list according to an example embodiment of the present disclosure.

The controller 203 may be configured to make a shopping list 500 including information about the goods selected by a user when the user finishes selecting the goods 300. The information about the selected goods included in the shopping list 500 may include the price of the goods, the name of the goods, a place at which to buy the goods, the manufacturer of the goods, etc.

The portable terminal 2 may be configured to provide information to a user through the display of the portable terminal 2 based on the received shopping list 500. As mentioned above, the shopping list 500 includes the name of the goods, the place at which to buy the goods, the price of the goods, and the like information. Further, the shopping list 500 may include a map 510 where a location 511 for purchasing the goods is specified.

The controller 203 may be configured to transmit the made shopping list 500 to the portable terminal 2 or the like external apparatus selected by a user through the communicator 201 if the shopping list 500 is made. In this example embodiment, the external apparatus to which the shopping list 500 is transmitted is the portable terminal 2 of a user, but not limited thereto. Alternatively, a UI including items respectively corresponding to the portable terminals 2 may be provided to a user, so as to transmit the made shopping list 500 to at least one portable terminal 2 selected by the user among the plurality of portable terminals 2.

The shopping list 500 may be directly transmitted from the display apparatus 1 to the selected portable terminal 2 through the Bluetooth or NFC communication, but not limited thereto. Alternatively, the shopping list 500 made in the display apparatus 1 may be transmitted to an information providing server or the like through the network, and then the information providing server may transmit the shopping list to the external apparatus selected by a user.

According to another example embodiment, the display apparatus 1 transmits the shopping list 500 to the information providing server, and a user controls the terminal apparatus or the portable terminal 2 to verify himself/herself and makes a request for the shopping list 500 to the information providing server. That is, the display apparatus 1 is not controlled to select the external apparatus to which the shopping list 500 will be transmitted, but the external apparatus is directly controlled to receive the shopping list 500 made in the display apparatus 1.

A user can obtain information about goods selected with reference to the shopping list 500 through the portable terminal 2, and thus purchase the goods based on the information. A detailed embodiment of using the shopping list 500 will be described later.

Figure 6:
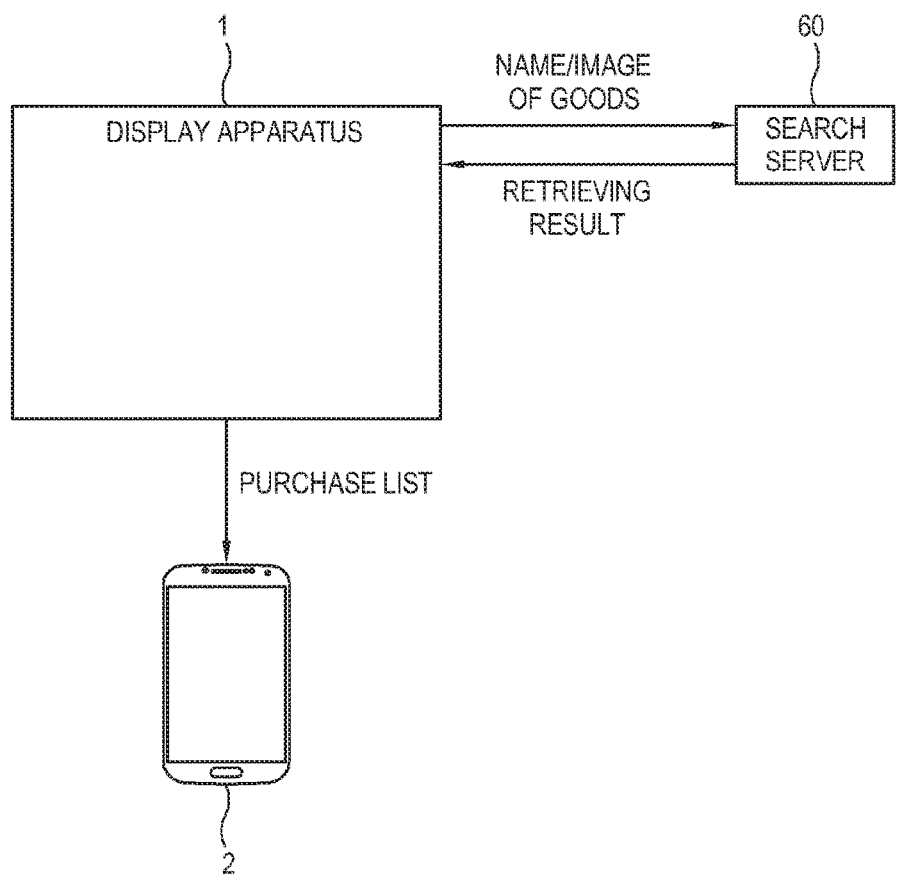
FIG. 6 is a diagram illustrating an example of retrieving information based on an image or name of goods selected by a user and providing the information to the user according to an example embodiment of the present disclosure.
Figure 7:
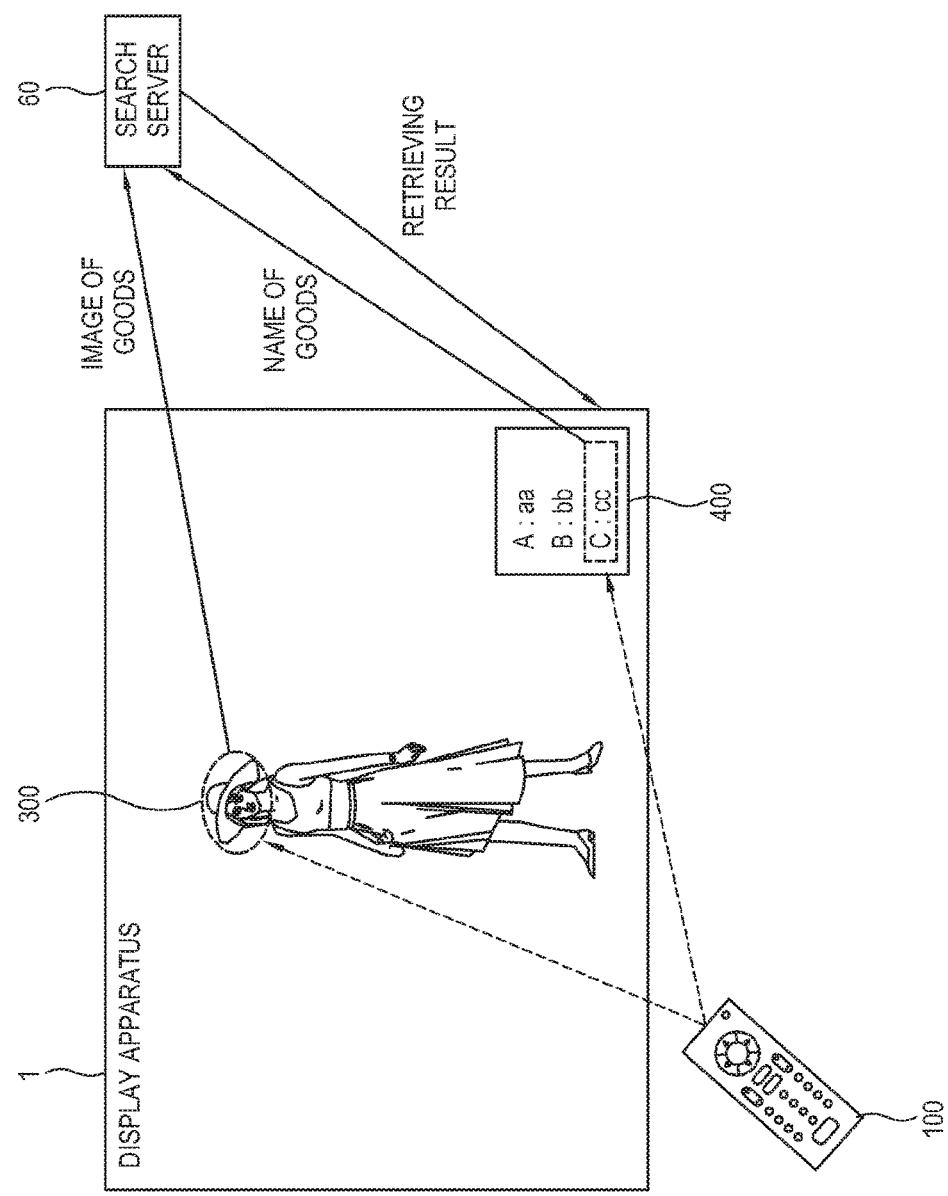
FIG. 7 is a diagram illustrating an example of retrieving information based on an image or name of goods selected by a user and providing the information to the user according to an example embodiment of the present disclosure.

FIGS. 6 and 7 are diagrams illustrating an example of retrieving information based on an image or name of goods selected by a user and providing the information to the user according to an example embodiment of the present disclosure.

As described above, the controller 203 employs the information about the goods 300 selected by a user in order to make the shopping list. The information corresponding to a broadcast signal received in the display apparatus 1 may be transmitted from the server 11 to the display apparatus 1 in connection with the broadcast signal, or may be transmitted from the server 11 to the display apparatus 1 as the display apparatus 1 makes a request for the information to the server 11 in response to a user's selection of the goods 300.

However, if the goods information related to the goods selected by a user is not previously stored in the server 11, the controller 203 cannot make a shopping list including the information about the goods 300 even though a user selects the goods 300. In particular, if a user makes a click or touch for selecting a partial area of the image but the selected area is not linked with the goods information provided by the server 11, the user cannot receive any information even though s/he selects the goods.

Thus, according to an example embodiment the controller 203 stores an image of a partial area when a user selects the partial area corresponding to the goods, determines whether the image matches with the goods, and controls the communicator 201 to transmit the stored image or the name of the goods to the search server 60 based on determination results.

FIG. 6 is a block diagram illustrating an example in which the information is exchanged among the display apparatus 1, the search server 60 and the portable terminal 2.

The display apparatus 1 transmits an image of an area selected by a user or a name of goods determined based on the image to the search server 60. The search server 60 retrieves the information based on the image or the name of the goods received through the Internet, and transmits a retrieving result to the display apparatus 1. The display apparatus 1 shows a user the information based on the retrieving result, and makes a shopping list including the information, thereby transmitting the shopping list to the portable terminal 2 or the like external apparatus.

If the partial area of the image selected by a user does not involve the goods, the search server 60 may output no retrieving result. Since the search server 60 performs retrieval assuming that the received image involves the goods, the search server 60 transmits no results of retrieving the goods to the display apparatus 1 when receiving the image of the partial area involving no goods.

If receiving no results of retrieval, the display apparatus 1 informs a user that no goods are retrieved and provides a UI for allowing the user to make selection again.

Further, the display apparatus 1 may directly determine whether the area selected by a user corresponds to the goods, output a warning if it is determined that the area does not correspond to the goods, and display a UI for re-selection.

The partial area selected from the image may be directly selected by clicking a certain area on the image in the remote controller 100, the mouse or the like external apparatus. In this case, the controller 203 may be configured to determine a preset range with respect to a certain area clicked by a use as an area selected by the user, and store the image of the selected area.

Further, a cursor moving on the display 200 corresponding to a position of the display 200 pointed by the remote controller 100 may be shaped like a circle having a preset range, and a user may select desired goods by moving the remote controller 100 or the like so that the circle can involve an area corresponding to the goods.

FIG. 7 illustrates an example in which a user selects the goods involved in a provided image, the display apparatus 1 provides the name or image of the selected goods to the search server 60, and the search server 60 retrieves information based on the name and image of the goods and provides retrieving results to the display apparatus 1.

As described above, if a user selects a partial area 300 corresponding to goods within an image, the controller 203 cannot link the selected area 300 with the goods information provided by the server 11 or may receive no information corresponding to the area 300 from the server 11 even though the controller 203 makes a request for the information. In this case, the controller 203 determines that retrieval is needed with regard to the area 300 selected by a user, and transmits the area of the area 300 selected by the user or the name of goods extracted from the area 300 to the search server 60.

The name of the goods may be extracted by an algorithm of extracting a text from an image and then transmitted as a text of the goods, or may be directly input by a user or selected through the UI 400. If a user does not input the name of the goods, the controller 203 extracts the image of the area 300 and transmits the extracted image to the search server 60 so that only the image of the area 300 selected by a user can be used in retrieval on the Internet.

The search server 60 retrieves the goods information on the Internet based on the image of the area 300 or the name of the goods received from the display apparatus 1, and provides a retrieving result to the display apparatus 1.

Figure 19:
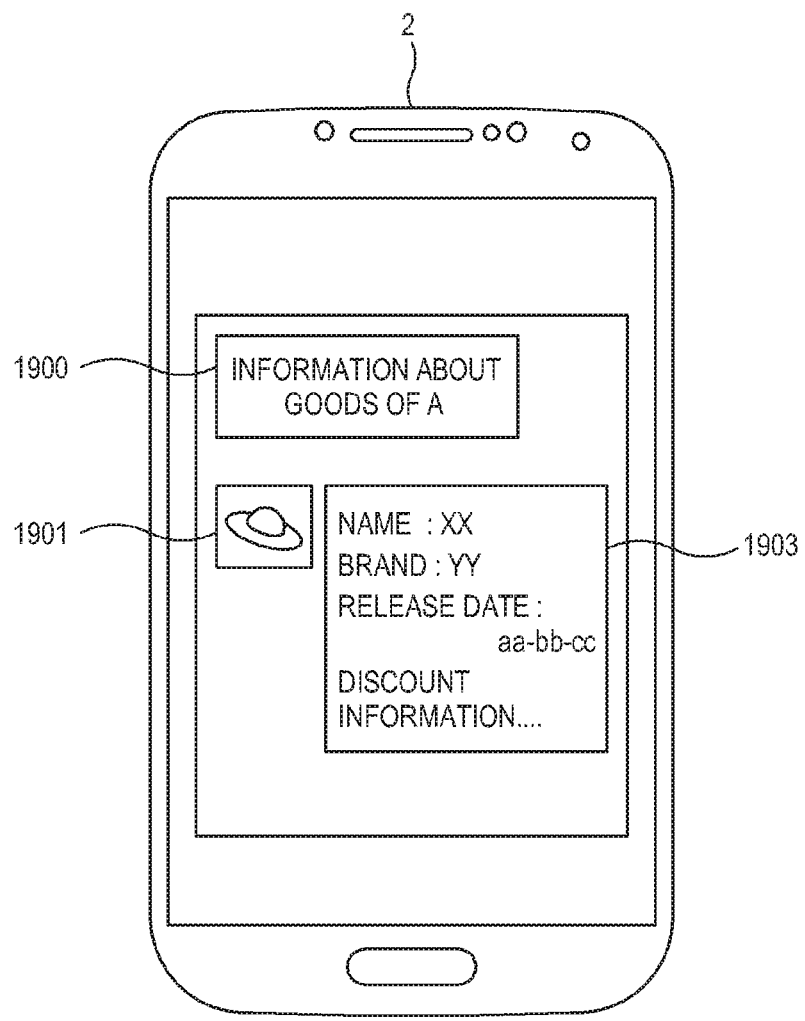
FIG. 19 is a diagram illustrating an example in which a portable terminal receives detailed information about goods from the display apparatus and provides the detailed information to a user according to an example embodiment of the present disclosure.

FIG. 19 illustrates an example in which a portable terminal receives detailed information about goods from the display apparatus and provides the detailed information to a user according to an example embodiment of the present disclosure.

If a user moves close to a location of goods after controlling the display apparatus 1 to transmit a shopping list to the portable terminal 2, the portable terminal 2 receives a user's location information from the sensor 13 or transmits location information generated by a global positioning system (GPS) to the display apparatus 1. For example, a user goes shopping in a mart provided with an infrared location transmitter or the like sensor 13, the portable terminal 2 transmits location information based on information received from the sensor 13 to the display apparatus 1, and the display apparatus 1 transits detailed information about goods close to the user in the shopping list based on the location information to the portable terminal 2. On the other hand, if a user is located in a place where the sensor 13 is not provided, the portable terminal 2 uses the GPS to generate location information, and transmits the location information to the display apparatus 1.

According to another example embodiment, the portable terminal 2 periodically transmits the location information to the display apparatus 1, and if it is determined that a distance between a location of at least one among the goods included in the shopping list and a user's location determined based on the location information is within a predetermined range, the display apparatus 1 informs the user of this and provides detailed information of at least one of the goods close to the user.

According to still another example embodiment, the portable terminal 2 may be configured to generate not only location information but also information related to various surrounding environments such as ambient temperature, a smell, a sound, etc. based on the information received from the external or internal sensor 13, and transmits the generated information to the display apparatus 1. Further, the display apparatus 1 may be configured to transmit detailed information of goods included in the shopping list corresponding to the state information to the portable terminal 2 based on various pieces of information received from the portable terminal 2.

The detailed information about the goods may include information related to the name, price, manufacturer, accurate location, etc. of the goods close to a user, and also include images before and after a predetermined period of time from the moment when a user selects the goods on the images displayed in the display apparatus 1 in order to include the goods in the shopping list.

If the detailed information of the goods is received from the display apparatus 1, the portable terminal 2 provides the received detailed information of the goods to a user, and displays a UI, which includes a guide 1900 for informing the goods information, an image 1901 of the goods and detailed information 1903 of the goods, through a display of the portable terminal 2. Further, the portable terminal 2 may be configured to inform a user of reception of the good information through vibration, sound or the like alarm, and provide a user with an image displayed when the user selects the goods.

If a user goes shopping in a mart, the portable terminal 2 may provide detailed information of goods received in a terminal apparatus of the mart and thus a user can receive information through the terminal apparatus.

Figure 8:
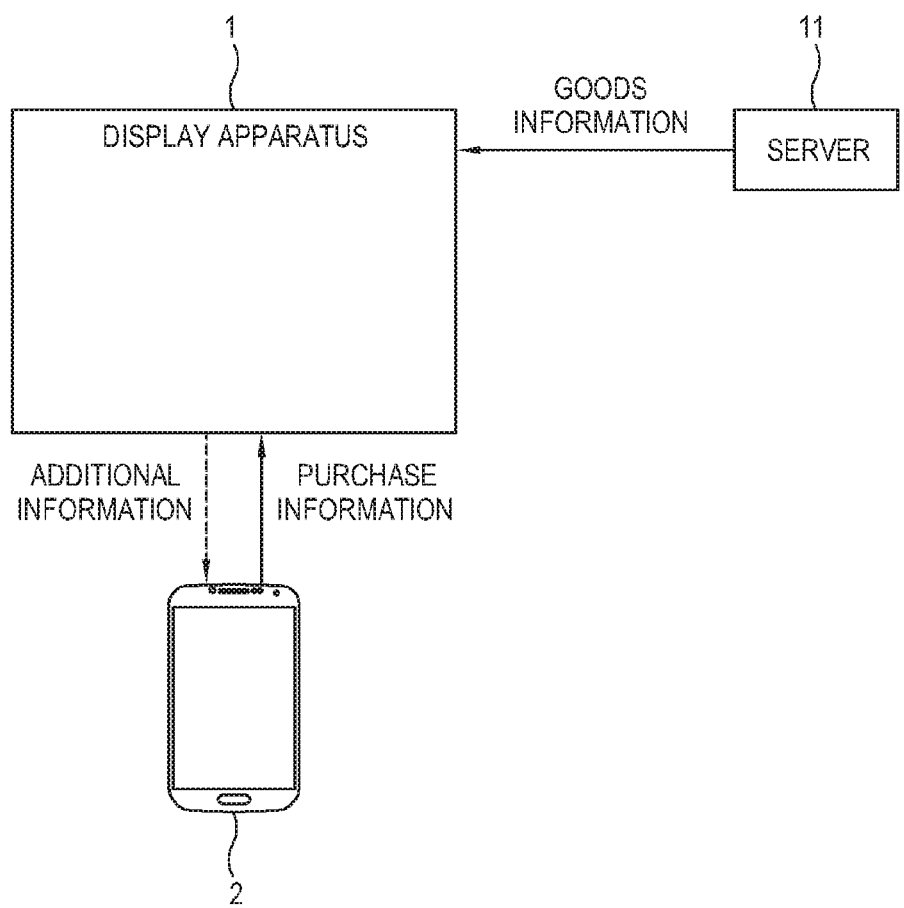
FIG. 8 is a diagram illustrating an example of exchanging purchase information and additional information between the portable terminal and the display apparatus according to an example embodiment of the present disclosure.

FIG. 8 is a diagram illustrating an example of exchanging purchase information and additional information between the portable terminal and the display apparatus according to an example embodiment of the present disclosure.

A user may go shopping with a shopping list received in the portable terminal 2. If the shopping is finished, the portable terminal 2 sends the display apparatus 1 the purchase information, e.g., information about whether the goods included in the shopping list is purchased or not. The display apparatus 1 may provide information about the purchased goods to a user based on the purchase information received from the portable terminal 2. The information about the purchased goods may include various pieces of information such as a method of using the goods, a method of keeping the goods, a refunding method, etc. Further, an example of shopping using the shopping list in the display apparatus 1 will be described later.

The controller 203 may be configured to display the information about the purchased goods based on the purchase information on the display 200 if the purchase information is received from the portable terminal 2. The information about the purchased goods may include various pieces of the information such as information about using the goods, information about keeping the goods, refunding information, information about goods related to the purchased goods. A user may refer to information through the display 200, and make an additional input for purchasing related goods or the like. The additional input may be to purchase the goods related to the purchased goods, but not limited thereto. Alternatively, the additional input may be a user's input for purchasing the additional goods while the information related to the purchased goods is being displayed.

Below, an example related to the purchased goods will be described with reference to the accompanying drawings.

Figure 9:
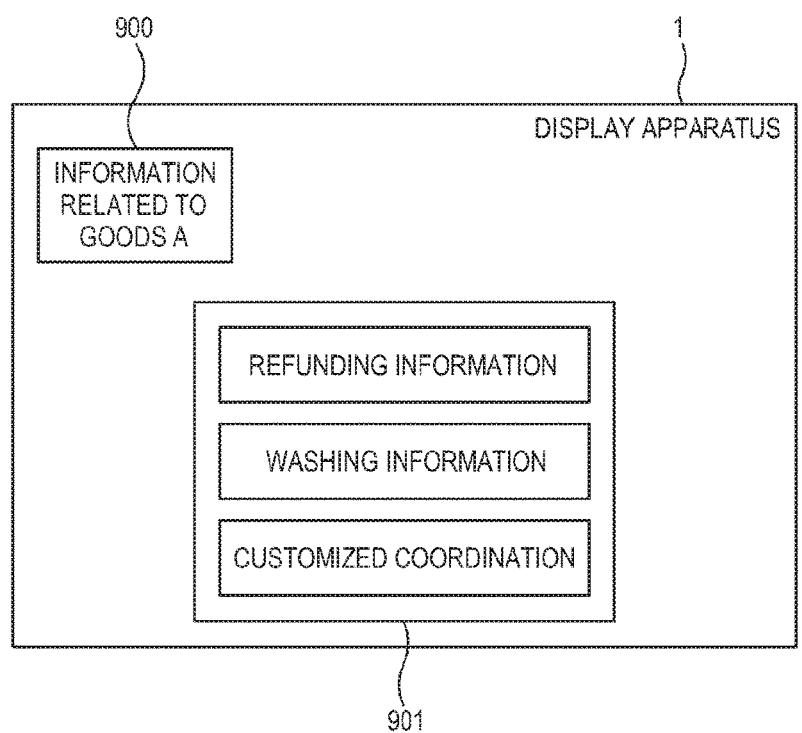
FIG. 9 is a diagram illustrating an example in which the display apparatus provides information to a user based on the purchase information received from the portable terminal according to an example embodiment of the present disclosure.
Figure 10:
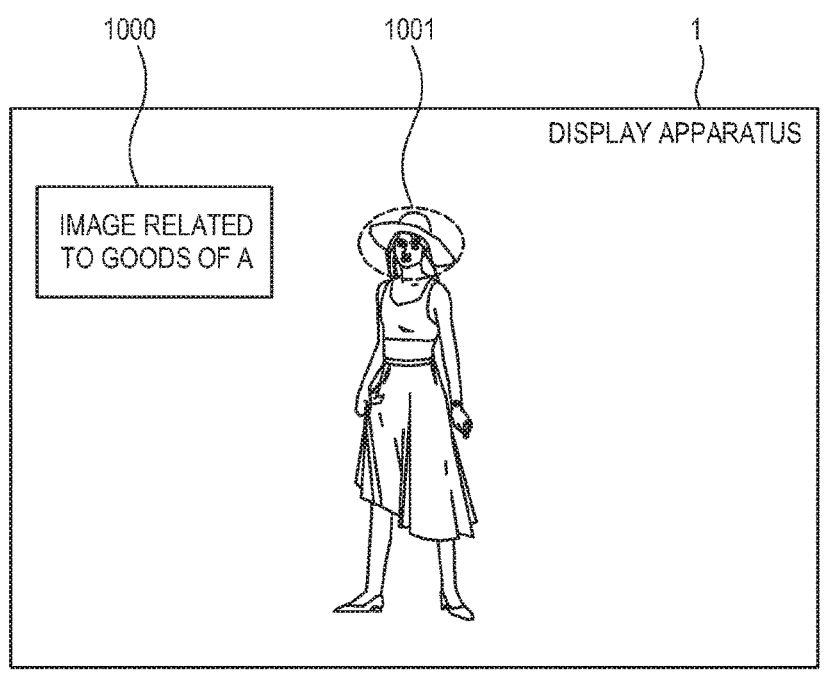
FIG. 10 is a diagram illustrating an example in which the display apparatus provides information to a user based on the purchase information received from the portable terminal according to an example embodiment of the present disclosure.

FIGS. 9 and 10 are diagrams illustrating an example in which the display apparatus provides information to a user based on the purchase information received from the portable terminal according to an example embodiment of the present disclosure.

FIG. 9 illustrates an example of various pieces of information provided to a user to use the purchased goods based on the purchase information received from the portable terminal 2.

As described above, the controller 203 may be configured to provide the information about the purchased goods to a user based on the purchase information, if the purchase information of informing that a user purchases the goods included in the shopping list is received from the portable terminal 2 through the communicator 201.

The information about the purchased goods may include various pieces of information such as the method of using the goods, the method of keeping the goods, the refunding method, etc., and this information may be received through the server 11. If there is no related information in the server 11, the controller 203 makes a request for searching to the search server 60, and receives information about the purchased goods from the search server 60, thereby providing the information.

The controller 203 may control the display 200 to display a UI which includes a guide 900 providing the information about the purchased goods, and items 901 corresponding to information about refunding the goods, information about keeping the goods and information related to the goods. a user may be provided with information by selecting a menu item 901 through the UI.

FIG. 10 illustrates an example in which the display apparatus 1 generates a first image 1000 based on an image displayed on the display 200 at the moment when a user selects goods 1001, and provides the generated image when the purchase information is received from the portable terminal 2.

The controller 203 may generate the first image 1000 based on the image displayed when a user selects the goods 1001, and store the first image 1000 in the storage 207. The first image 10000 may include a still image stored by capturing an image of a user selecting the goods 1001, or a moving image stored as much as a preset period of time with respect to the moment of selecting the goods.

Further, the controller 203 controls the display 200 to provide the first image 1000 to a user if the purchase information is received from the portable terminal 2 through the communicator 201. This is to record the image at the moment when a user selects the goods 1001 and remind the user why s/he selects the goods 1001. Therefore, a user can remember his/her original purpose with reference to the first image 1000. For example, as shown in FIG. 10, a hat 1001 on an image is added to the shopping list and purchased in order to dress like a model on the image, and then the purchase information is transmitted to the display apparatus 1 so that the display apparatus 1 can provide a user with an image at the moment when the user selects the hat 1001. Thus, a user may purchase other clothes based on this image or may dress with reference to the image.

Below, an example embodiment of a smart shopping system, in which the portable terminal 2 of receiving the shopping list is used by a user to go shopping, will be described.

Figure 11:
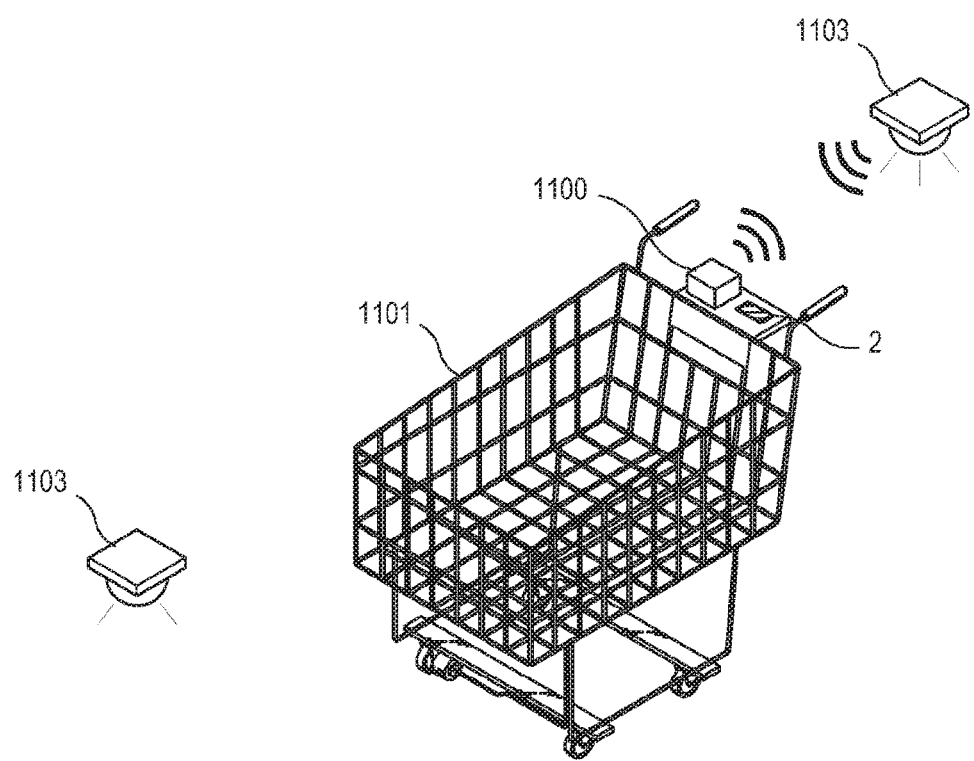
FIG. 11 is a diagram illustrating an example of a smart shopping system according to an example embodiment of the present disclosure.

FIG. 11 is a diagram illustrating an example of a smart shopping system according to an example embodiment of the present disclosure.

In this example embodiment, the smart shopping system will be described under condition that a user goes shopping in a market such as a large supermarket, but is not limited thereto. A user may use the present smart shopping system to purchase the goods from various kinds of stores such as a shopping center, a department store, an outlet mall, a discount store, a road shop, a shopping mall, etc. based on the shopping list made in the display apparatus 1.

A user controls the display apparatus 1 to transmit the shopping list to the portable terminal 2, or controls the portable terminal 2 to receive the shopping list transmitted to the information providing server. Further, the portable terminal 2 may be configured to transmit the shopping list to a terminal apparatus 1100 of the cart 1101 in response to a request from the terminal apparatus 1100 of the cart 1101 when a user attaches the portable terminal 2 to the shopping cart 1101.

In the following example embodiment, the portable terminal 2 and the terminal apparatus 1100 are provided as separate apparatuses, and the portable terminal 2 transmits the shopping list to the terminal apparatus 1100, but not limited thereto. If the portable terminal 2 is attached to the cart 1101 without the separate terminal apparatus 1100, the portable terminal 2 may be configured to serve as the terminal apparatus 1100. On the other hand, the terminal apparatus 1100 may also serve as the portable terminal 2. However, in this case where the terminal apparatus 1100 of the cart 1101 serves as the portable terminal 2, it is impossible to transmit the shopping list to the terminal apparatus 1100 by controlling the display apparatus 1, and a user has to verify himself/herself in the terminal apparatus 1100 in order to receive and use the shopping list transmitted from the display apparatus 1 to the information providing server.

The portable terminal 2 may include a display, a communicator, a payment processor, and at least one processor for controlling general operations of the portable terminal 2. The portable terminal 2 is configured to provide information to a user through the display, and communicate with various external apparatuses such as the display apparatus 1, the terminal apparatus 1100, and other sensors 13 through the communicator. The portable terminal 2 receives the shopping list from the display apparatus 1 so that the shopping list can be provided to the terminal apparatus 1100 or directly displayed thereto. Further, the portable terminal 2 may be configured to receive various pieces of surrounding state information such as the location, etc. from the sensor 13 and transmit the received information to the display apparatus 1, and provide a user with guide information based on detailed information of the goods corresponding to the state information received from the display apparatus 1.

The state information transmitted from the portable terminal 2 may include location information of the portable terminal 2 received from the surrounding sensor 13, a surrounding smell, sound and temperature, the shape of the goods, the lay of the land and the like information to be sensed by the sensor 13. The sensor 13 is not limited to the external sensor 13, and the built-in sensor 13 internally provided in the portable terminal 2 may also serve as the sensor 13 for generating the state information.

According to another example embodiment, the portable terminal 2 may be configured to send the display apparatus 1 the information about the shape of the goods, the lay of the land, etc. photographed using the camera of the portable terminal 2 or an external camera. The display apparatus 1 compares the shape of the goods received from the portable terminal 2 and the outer appearance of the goods included in the shopping list, and determines whether the image of the goods selected by a user is received, thereby transmitting the comparison result and information about the state of the goods to the portable terminal 2.

Further, the portable terminal 2 includes the payment processor configured to communicate with a server of a credit card company or the like apparatus for user verification and payment through personal information related to the payment received from a user, thereby processing a user's goods payment. The payment processor may be provided in the portable terminal 2, but not limited thereto. Alternatively, the payment processor may be provided in the terminal apparatus 1100. In this case, the portable terminal 2 may be configured to just provide a user's information.

The terminal apparatus 1100 may be configured to receive the shopping list from the portable terminal 2 and provide the information based on the shopping list to a user. The information based on the shopping list may include the price of the goods included in the shopping list, the location of the goods, the shopping information of the goods, and information about different goods related to the goods.

In addition, the terminal apparatus 1100 may be configured to compare the current location of a user and the location of the goods, and communicate with at least one local transmitter 1103 of a market in order to provide the location information to the user. The local transmitter 1103 outputs an infrared (IR) signal, and the terminal apparatus 1100 may be configured to provide related information to a user by receiving the IR signal and detecting the current location, transmit information based on the IR signal to a main server through a network, or receive the information about the current location from a main computer. The method of detecting a user's current location through the communication between the terminal apparatus 1100 and the local transmitter 1103 is not limited to the foregoing description since it may be achieved by various publicly known methods.

The terminal apparatus 1100 may be configured to detect a user's location in the market through the communication with the local transmitter 1103 and then transmit the location information to the portable terminal 2. The portable terminal 2 may be configured to transmit the location information from the terminal apparatus 1100 to the display apparatus 1, and receive detailed information about the goods closes to a user from the display apparatus 1 and transmit the detailed information to the terminal apparatus 1100. The terminal apparatus 1100 may be configured to provide the received information to a user through the terminal apparatus 1100.

As described above, if the terminal apparatus 1100 is used instead of the portable terminal 2, the terminal apparatus 1100 is configured to communicate with the display apparatus 1 through a network server in order to provide the location information and receive information about goods.

According to another example embodiment, the portable terminal 2 may be configured to directly communicate with the local transmitter 1103 and generate location information about a user's location.

Figure 12:
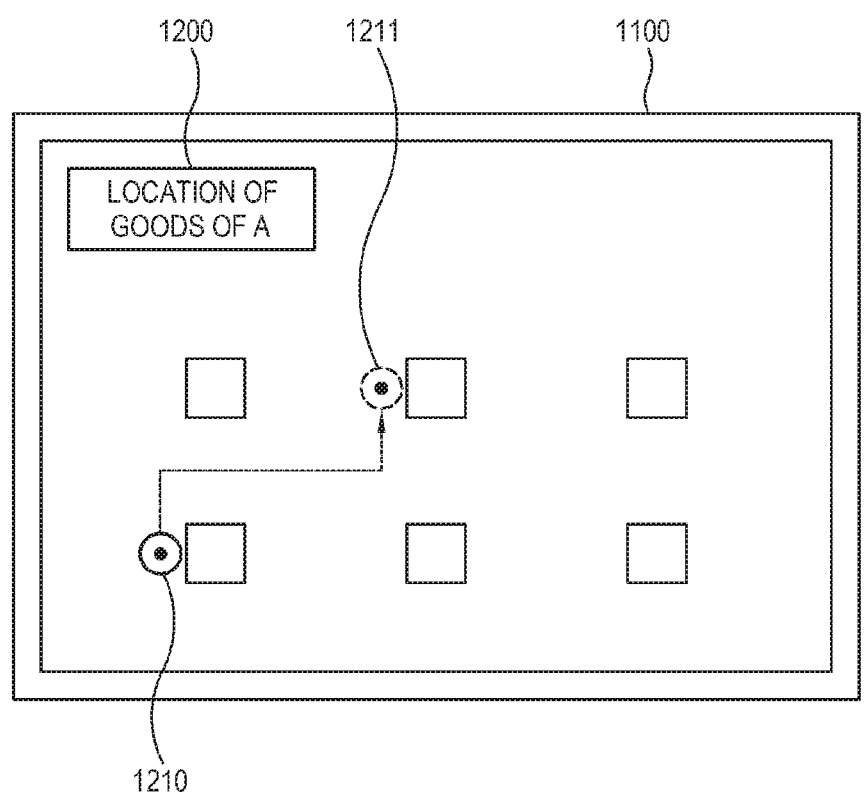
FIG. 12 is a diagram illustrating an example of location information provided to a user by the terminal apparatus of the cart according to an example embodiment of the present disclosure.

FIG. 12 is a diagram illustrating an example of location information provided to a user by the terminal apparatus of the cart 1101 according to an example embodiment of the present disclosure.

If a user controls the terminal apparatus 1100 to select an item for the goods included in the shopping list, the terminal apparatus 1100 may provide a UI that includes a guide 1200 of informing the information about the location of goods, and guide the current location 1210 of the user, the current location 1211 of the selected goods, and a path from the current location to the location 1211 of the selected goods.

FIG. 12 shows only one of the goods, but not limited thereto. Alternatively, the terminal apparatus 1100 may be configured to display respective paths to a plurality of goods selected by a user or a user's optimal path for purchasing the plurality of selected goods.

Figure 13:
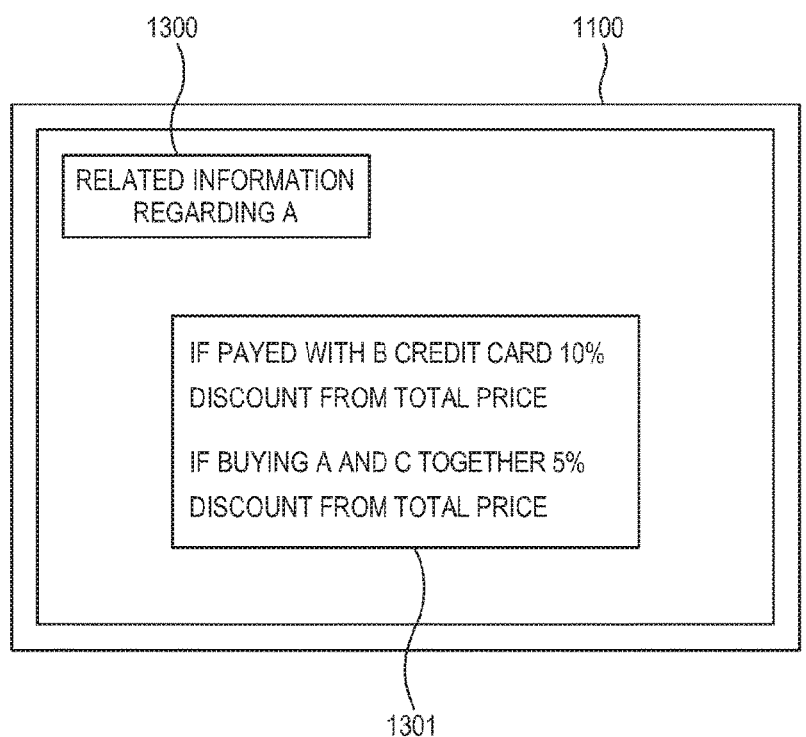
FIG. 13 is a diagram illustrating an example of goods information provided to a user by the terminal apparatus of the cart according to an example embodiment of the present disclosure.

FIG. 13 is a diagram illustrating an example of goods information provided to a user by the terminal apparatus of the cart 1101 according to an example embodiment of the present disclosure.

As described above, the terminal apparatus 1100 may be configured to use its own display for providing information related to goods included in a user's shopping list. If a user controls the terminal apparatus 1100 to select one among the goods included in the shopping list, the terminal apparatus 1100 may provide a UI that includes a guide 1300 of informing the information about the selected goods, and various pieces of information 1301 such as discount information of the selected goods, etc.

According to another example embodiment, information about the goods around a user may be provided in accordance with his/her current location determined based on communication with the local transmitter 1103. For example, if a user is in a dairy section, information offering a 20% discount on milk A or offering a buy-one-get-one-free on yogurt B.

Figure 14:
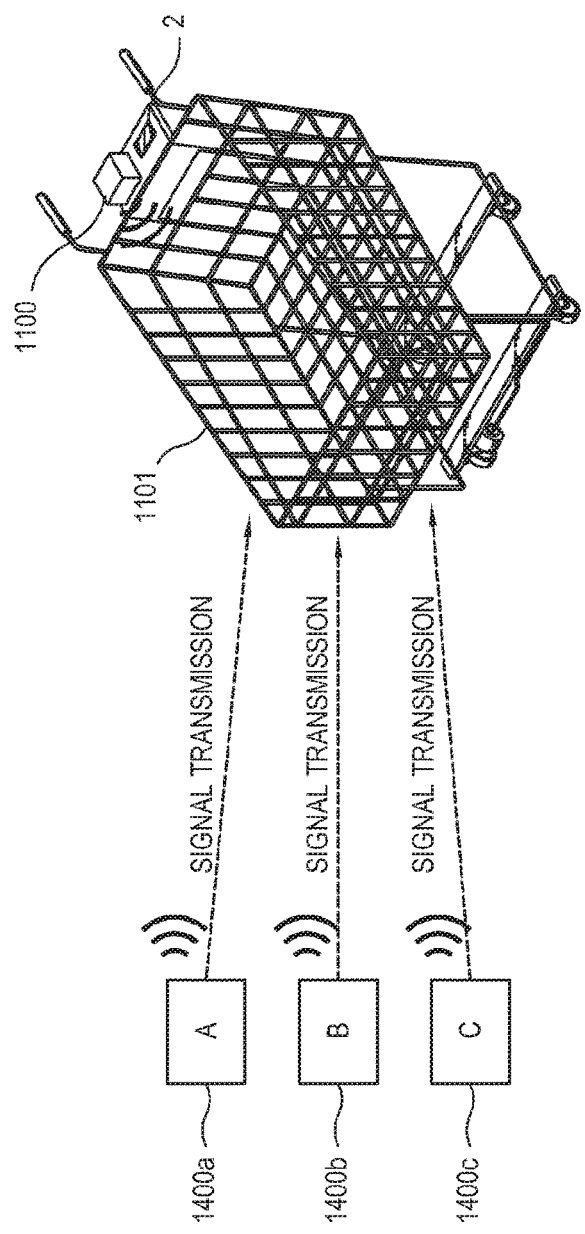
FIG. 14 is a diagram illustrating an example of communication between the terminal apparatus of the cart and goods when the goods are loaded into the cart according to an example embodiment of the present disclosure.

FIG. 14 is a diagram illustrating an example of communication between the terminal apparatus of the cart 1101 and goods when the goods are loaded into the cart 1101 according to an example embodiment of the present disclosure.

The goods 1400a, 1400b and 1400c have price tags to which near field communication modules for communication with the terminal apparatus 1100 may be attached. The terminal apparatus 1100 may be configured to determine whether the goods 1400a to 1400c are loaded to or unloaded from the cart 1101 based on the communication with the near field communication modules provided in the price tags of the goods 1400a to 1400c. The terminal apparatus 1100 may be configured to provide information about the loaded goods 1400a to 1400c, such as the price, expiration date, etc. of the goods 1400a to 1400c to a user, and support a payment service convenient for a user to make payment based on the information about the loaded goods 1400a to 1400c. The terminal apparatus 1100 periodically communicates with the near field communication modules of the goods 1400a to 1400c so as to check whether the goods 1400a to 1400c are still loaded, and updates a list of goods if there is a change in the loading state of the goods 1400a to 1400c.

Further, the terminal apparatus 1100 may be configured to provide information about the loaded goods 1400a to 1400c to a user when the goods 1400a to 1400c are loaded into the cart 1101.

Figure 15:
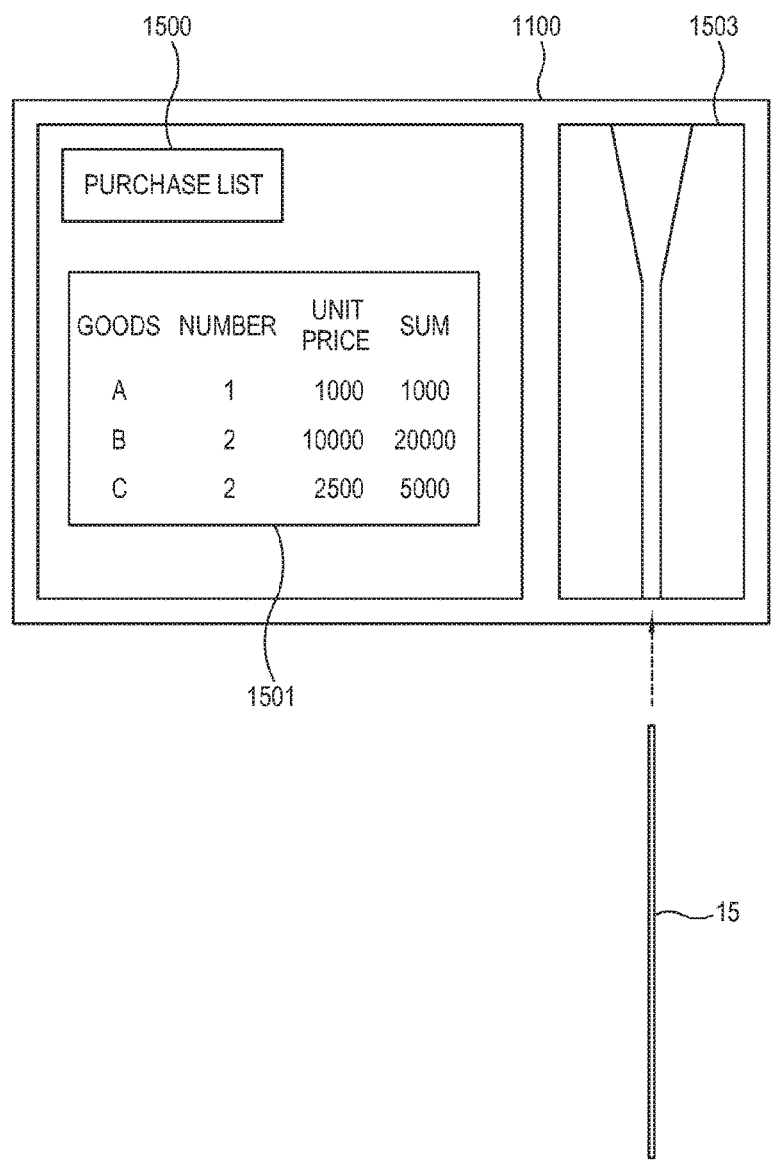
FIG. 15 is a diagram illustrating an example in which a user employs the terminal apparatus of the cart to pay for the goods loaded into the cart according to an example embodiment of the present disclosure.

FIG. 15 is a diagram illustrating an example in which a user employs the terminal apparatus of the cart 1101 to pay for the goods loaded into the cart 1101 according to an example embodiment.

As described above, the terminal apparatus 1100 may be configured to provide the information about the goods loaded into the cart 1101 to a user through communication between the near field communication modules of the goods 1400a to 1400c and the terminal apparatus 1100.

Thus, a user compares the goods loaded into the cart 1101 by him/her with the information through the display of the terminal apparatus 1100. The information about the loaded goods displayed through the display may include a guide 1500 for informing a user's purchase list and an item 1501 including the name, number, unit price and sum of goods. A user touches a credit card 15 or the like to a payment means 1503 provided in the terminal apparatus 1100 in order to provide payment information, and the terminal apparatus 1100 communicates with a payment server to thereby complete a user's payment. Further, the terminal apparatus 1100 may be configured to inform a user that the payment is completed, through the display or the like when the payment is completed.

Figure 16:
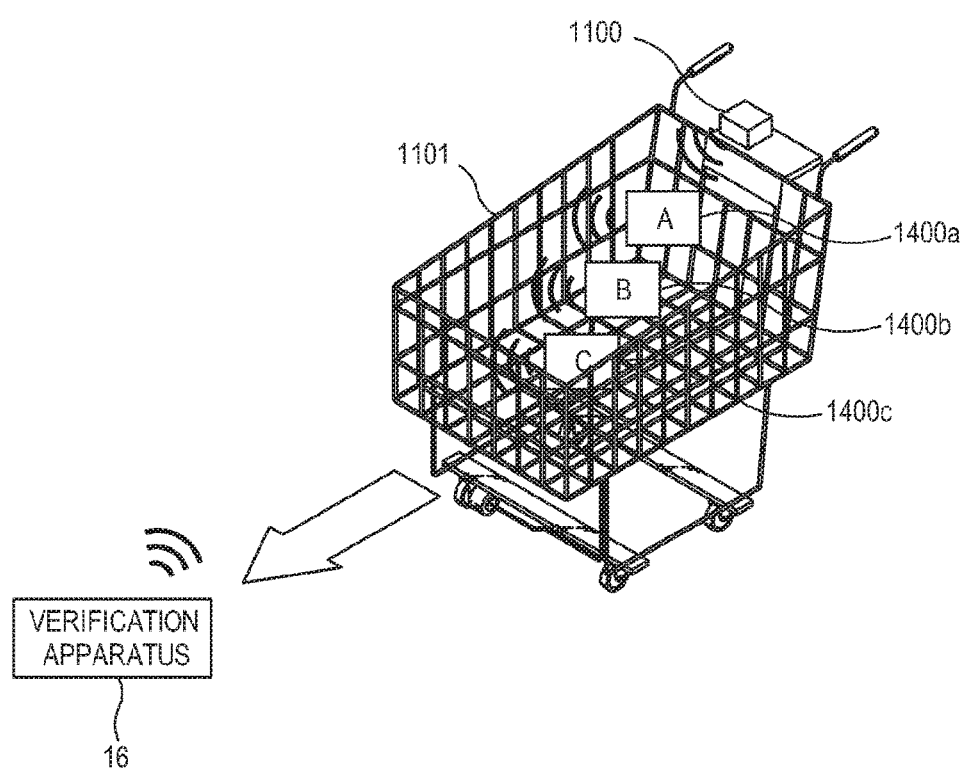
FIG. 16 is a diagram illustrating an example in which a verification apparatus according to an example embodiment of the present disclosure verifies a user's payment through communication with the goods loaded into a cart and a terminal apparatus of the cart.

FIG. 16 is a diagram illustrating an example that a verification apparatus according to an example embodiment of the present disclosure verifies a user's payment through communication with the goods loaded into the cart 1101 and the terminal apparatus of the cart 1101.

A user, who checks that the payment is completed, can come out from the mart after passing through a verification apparatus 16 for payment and getting confirmation of whether the payment is normally made or not. The verification apparatus 16 communicates with the terminal apparatus 1100 and the near field communication modules of the goods 1400a to 1400c (illustrated as A, B and C), and compares the goods 1400a to 1400c loaded into the cart 1101 with a payment breakdown, thereby allowing a user to check whether the payment has been made for all the goods 1400a-1400c loaded into the cart 1101. The verification apparatus 16 may be configured to additionally make payment for the goods 1400a to 1400c missed in the verification apparatus 16 if it is determined based on the comparison that there are unpaid goods 1400a to 1400c.

Figure 17:
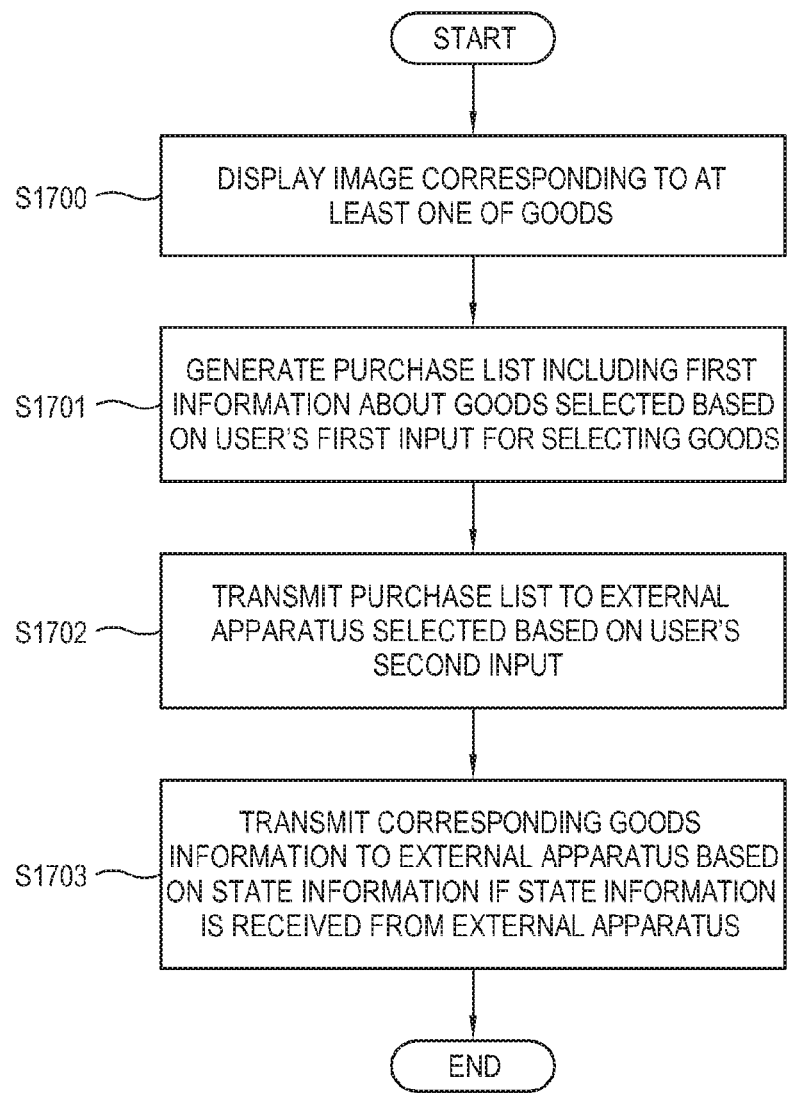
FIG. 17 is a flowchart illustrating an example method of operating the display apparatus according to an example embodiment of the present disclosure.

FIG. 17 is a flowchart illustrating an example of operating a display apparatus according to an example embodiment of the present disclosure.

At operation S1700, the controller 203 controls the display 200 to display 200 an image corresponding to at least one of goods. At operation S1701, the controller 203 generates a shopping list including first information about goods selected by a user's first input. At operation S1702, the controller 203 controls the communicator 201 to transmit the made shopping list to the external apparatus 2 selected by a user's second input. At operation S1703, the controller 203 receives location information from the external apparatus 2, and transmits goods information corresponding to the received location information to the external apparatus 2.

Figure 18:
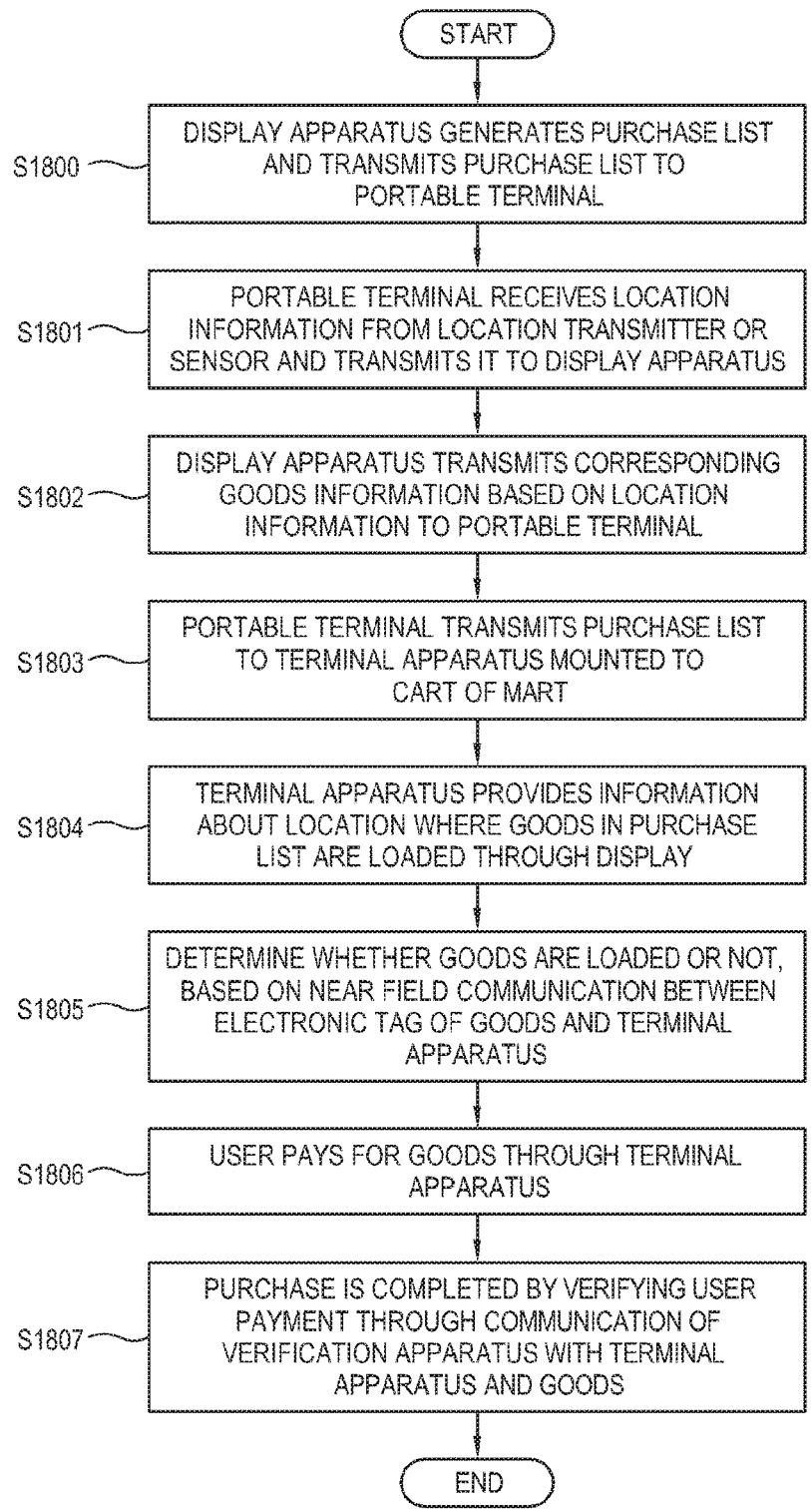
FIG. 18 is a flowchart illustrating an example method of operating a smart shopping system according to an example embodiment of the present disclosure.

FIG. 18 is a flowchart illustrating a method of operating a smart shopping system according to an example embodiment of the present disclosure.

At operation S1800, the display apparatus 1 generates a shopping list based on a user's input, and transmits the shopping list to the external apparatus, e.g., to the portable terminal 2. At operation S1801, the portable terminal 2 receives location information from the local transmitter 1103 or the sensor 13 and transmits the location information to the display apparatus 1. According to another example embodiment, as described above, the portable terminal 2 may directly generate the location information, or receive the location information from the terminal apparatus 1100 of the cart 1101.

At operation S1802, the display apparatus 1 transmits the goods information corresponding to the received location information to the portable terminal 2. At operation S1803, the portable terminal 2 transmits the shopping list to the terminal apparatus 1100 mounted to the cart 1101 of the mart. At operation S1804, the terminal apparatus 1100 provides information about locations where the goods 1400a to 1400c included in the shopping list are loaded, through the display of the terminal apparatus 1100. At operation S1805, the terminal apparatus 1100 determines whether the goods 1400a to 1400c are loaded or not, based on the near field communication with the near field communication module, e.g., an electronic tag of the goods if a user puts the goods 1400a to 1400c into the cart 1101. At operation S1806, a user pays for the goods through the payment means 1503 such as a card reader 1503 of the terminal apparatus 1100. At operation S1807, the verification apparatus 16 communicates with the terminal apparatus 1100 and the goods 1400a to 1400c loaded into the cart 1101, thereby verifying a user's payment.

As described above, according to an example embodiment, it is convenient for a user to select goods while viewing an image on the display apparatus and go shopping based on shopping list including information about selected goods.

Although a various example embodiments have been illustrated and described, it will be appreciated by those skilled in the art that changes may be made in these example embodiments without departing from the principles and spirit of the disclosure, the scope of which is defined in the appended claims and their equivalents.

What is claimed is:

1. A display apparatus comprising:
   a display;
   a communicator comprising communication circuitry configured to communicate with an external apparatus;
   input circuitry configured to receive an input; and
   a controller configured to control the display to display an image based on a received broadcast signal, to generate a shopping list comprising information about selected goods based on an input selecting goods in the image displayed based on the broadcast signal, and to control the communicator to send the external apparatus detailed information about at least one of the goods included in the shopping list, the information including corresponding state information if the state information is received from the external apparatus.

2. The display apparatus according to claim 1, wherein the information about the selected goods comprises at least one of: a name, a price, a place where to buy and a manufacturer of the selected goods.

3. The display apparatus according to claim 1, wherein, if purchase information that the goods included in the transmitted shopping list are purchased is received from the external apparatus, the controller is configured to control the display to display information about at least one of: methods of using, refunding, keeping the purchased goods, and other goods related to the purchased goods.

4. The display apparatus according to claim 3, wherein the controller is configured to update the shopping list with the information about the related goods in response to an input selecting different goods related to the purchased goods, and to transmit the updated shopping list to the external apparatus.

5. The display apparatus according to claim 1, wherein the state information comprises information including at least one of: a location, a temperature, a smell and a sound of an external apparatus.

6. The display apparatus according to claim 1, wherein the detailed information comprises an image displayed on the display when a user selects the goods.

7. The display apparatus according to claim 1, wherein the controller is configured to add goods in a partial area of the image to the shopping list based on an input selecting the partial area.

8. The display apparatus according to claim 1, wherein, if the state information is received from a plurality of external apparatuses, the controller is configured to transmit at least one piece of detailed information corresponding to each received state information among the goods included in the shopping list to each external apparatus from which the state information is received.

9. A method of controlling a display apparatus, the method comprising:
   displaying an image on a display based on a received broadcast signal;
   generating a shopping list comprising information about selected goods based on an input selecting goods in the image displayed based on the broadcast signal; and
   sending, to an external apparatus, detailed information about at least one of the goods included in the shopping list, the information including corresponding state information if the state information is received from the external apparatus.

10. The method according to claim 9, wherein the information about the selected goods comprises information including at least one of: a name, a price, a place where to buy and a manufacturer of the selected goods.

11. The method according to claim 9, further comprising: displaying information about at least one of: methods of using, refunding, keeping the purchased goods, and other goods related to the purchased goods if purchase information that the goods included in the transmitted shopping list are purchased is received from the external apparatus.

12. The method according to claim 11, further comprising:
    updating the shopping list with the information about the related goods in response to an input selecting different goods related to the purchased goods; and
    transmitting the updated shopping list to the external apparatus.

13. The method according to claim 9, wherein the state information comprises information including a least one of: a location, a temperature, a smell and a sound of the external apparatus.

14. The method according to claim 9, wherein the detailed information comprises an image displayed on the display when a user selects the goods.

15. The method according to claim 9, wherein the generating the shopping list comprises adding goods in a partial area of the image to the shopping list based on an input selecting the partial area.

16. The method according to claim 9, further comprising: if the state information is received from a plurality of external apparatuses, transmitting detailed information corresponding to at least one received state information among the goods included in the shopping list to each external apparatus from which the state information is received.

* * * * *